(12) United States Patent
Wells et al.

(10) Patent No.: US 6,216,138 B1
(45) Date of Patent: Apr. 10, 2001

(54) COMPUTER INTERFACE SYSTEM FOR AUTOMATICALLY GENERATING GRAPHICAL REPRESENTATIONS OF COMPUTER OPERATIONS LINKED TOGETHER ACCORDING TO FUNCTIONAL RELATIONSHIPS

(75) Inventors: Robert Edward Wells, Arlington; Kenneth F. Karnofsky, Lexington; Robert William Green, Medford; Anne Marie Dolce, Arlington; Ernesto Ramos, Cambridge; Sasson Havusha, Swampscott, all of MA (US)

(73) Assignee: Brooks Automation Inc., Chelmsford, MA (US)

( * ) Notice: Subject to any disclaimer, the term of this patent is extended or adjusted under 35 U.S.C. 154(b) by 0 days.

(21) Appl. No.: 08/231,531

(22) Filed: Apr. 22, 1994

(51) Int. Cl.[7] ................................................. G06F 17/50
(52) U.S. Cl. .......................... 707/502; 345/326; 345/348
(58) Field of Search ................................ 395/140, 155, 395/156, 157, 159, 160, 161; 707/502; 345/326, 348

(56) References Cited

U.S. PATENT DOCUMENTS

| 4,901,221 | * | 2/1990 | Kodosky et al. | 395/159 |
|---|---|---|---|---|
| 5,179,657 | * | 1/1993 | Dykstal et al. | 395/161 |
| 5,313,574 | * | 5/1994 | Beethe | 395/159 |
| 5,313,575 | * | 5/1994 | Beethe | 395/159 |

OTHER PUBLICATIONS

*Macintosh Human Interface Guidelines*, Apple Computer, Inc., 1992, pp. 70, 104, 105.*
"Technical Report, Iris Explorer™", Silicon Graphics Computer Systems (1991).
"N! Power Family Overview™", Signal Technology, Inc. (Jun. 1991).
*Macromedia Director Overview Manual*, Macromedia, Inc. Mar. 1993, pp. 1–75.

* cited by examiner

*Primary Examiner*—Stephen S. Hong
(74) *Attorney, Agent, or Firm*—Perman & Green, LLP

(57) ABSTRACT

Computer system including a computer interface that automatically generates unique graphical representations of computer operations such as data access operations, analysis operations, and graphics operations, linked together by graphical representations of functional relationships existing between the various operations.

21 Claims, 11 Drawing Sheets

COMPUTER INTERFACE SYSTEM FOR AUTOMATICALLY GENERATING GRAPHICAL REPRESENTATIONS OF COMPUTER OPERATIONS LINKED TOGETHER ACCORDING TO FUNCTIONAL RELATIONSHIPS

FIELD OF INVENTION

The present invention is directed to a computer interface system and, more particularly, to a computer system including a computer interface that automatically generates graphical representations of computer operations such as data access operations, analysis operations and graphics operations, linked together by graphical representations of functional relationships.

BACKGROUND OF THE INVENTION

Modern business and scientific endeavors frequently require that vast amounts of data stored on computer systems be accessed and analyzed to provide solutions to everyday problems. To facilitate the analysis of such vast amounts of data, a variety of computer software tools have been developed to access data bases, to graph data, and to perform various forms of statistical analysis of such data.

Frequently, a variety of such software tools are combined in a single integrated package referred to generally as a statistical analysis package. While the combination of a variety of statistical analysis tools in a single software package has greatly facilitated the process of data analysis in general, known data analysis packages still have many drawbacks associated largely with ease of use.

Ease of use relates to a user's ability to quickly and efficiently analyze data in order to solve problems through the use of a software package. It also relates to a user's ability to repeat previously performed analysis on new sets of data, to continue a data analysis process after having been interrupted before completing a particular data analysis task, and to generate data analysis results in a format that explains not only the results but also how they were obtained.

One approach used to make data analysis packages easier to use has been based on the idea of graphical programming. In accordance with this concept, data sets, data analysis operations and graphics operations are represented as individual graphical elements on a screen. A person seeking to perform specific data analysis on one or more data sets graphically links elements representing the data set to be processed to one or more graphically represented data analysis operations. In this manner, a user manually generates a graphic representation or graphical data flow diagram (hereinafter "GDFD") of the data analysis steps to be performed on a selected data set through the use of a graphical programming interface. The IRIS Explorer by Silicon Graphics Computer Systems is an example of one data analysis package that supports such a graphical programming interface feature.

The use of such graphical programming interfaces offers several ease of use advantages over other more conventional approaches to data analysis interfaces. For example, a relatively inexperienced user can easily combine various data analysis modules graphically to perform complex data analysis tasks, e.g., by linking graphically represented modules together with arrows, while having relatively little understanding of how the modules or underlying program operates. Furthermore, the GDFD directly created by the user to perform the data analysis functions provides a graphic representation of the data analysis process performed.

Such a GDFD of the data analysis steps performed may facilitate the repeating of previously specified analysis on new sets of data and presents an easy to explain graphical representation of both the data analysis steps performed and the results which were generated. In addition, the graphic map generated by the user through the use of the graphical programming interface serves both to remind the user what analysis steps have been performed and provides a record of the data processing steps that can be stored, retrieved, and graphically modified to be used with future data analysis applications.

While graphical programming interfaces offer many ease of use advantages when applied to data analysis packages, they also have several drawbacks. For instance, such graphical programming interfaces generally require a user to become accustomed to representing a data analysis process as a series of graphical steps and to conduct data analysis and graphics operations through the use of a graphical interface which differs substantially from the pull-down menu type interfaces many users are accustomed to using.

Thus, in a graphical programming interface environment a user is frequently confronted with an unfamiliar command environment where the user may end up spending time concentrating on the graphical representation of steps and the order in which the steps must be performed to satisfy the requirements of the graphical programming language or interface rather then simply concentrating on solving the problem presented for analysis.

Thus, it is desirable to obtain the ease of use advantages offered by the graphical map which results from a graphical programming interface environment while eliminating the need for the user to create such a map through graphical programming.

Accordingly, there is a need for a computer interface system, that will automatically generate a graphical representation of a series of operations performed by a computer in response to a user accessing a series of pull-down menus, linked together according to the functional relationships that exist between the performed operations.

Furthermore, there is a need to implement such a computer interface system in the context of a data analysis package to facilitate the recording, reproducing, and later editing of the series of data analysis operations performed during a work session.

SUMMARY OF THE INVENTION

The present invention is directed to a computer interface system and, more particularly, a computer system including a computer interface that automatically generates graphical representations of computer operations such as data access operations, analysis operations and graphics operations, linked together by graphical representations of functional relationships, e.g, a GDFD.

Significantly, the computer interface of the present invention offers the advantages of a graphical programming environment, e.g., a GDFD, without requiring a user to perform any graphical programming.

In one exemplary embodiment, the computer interface system of the present invention is implemented as part of a statistical analysis package.

While the computer interface of the present invention may be incorporated into a wide variety of computer applications, it will generally be described with reference to the exemplary statistical analysis package embodiment.

The statistical analysis package of the present invention overcomes many of the disadvantages of the prior art by providing a convenient, easy to use hierarchical pull-down menu command structure while offering many of the advantages of a graphical programming environment. In particular, the statistical analysis package of the present invention automatically generates a graphical map, e.g., a graphical representation of data, graphics and analysis operations, in response to commands selected by a pull-down command menu.

The functionally linked graphical representation of data, analysis operations and graphics operations, generated by the statistical analysis package of the present invention will hereinafter be referred to as a GDFD.

A GDFD is a directed acyclic graph which provides a visual presentation of how data flows through the data analysis system of the present invention. The nodes in the GDFD represent elements in the system, e.g., data sets, analysis operations, and graphs. As with maps generated by graphical programming, the computer generated GDFD of the present invention serves to remind a user what analysis steps have been performed and provides a record of the data processing steps that can be stored, retrieved, and graphically modified to be used in future data analysis sessions.

Because the statistical analysis package of the present invention automatically generates a GDFD as a user performs a series of statistical analysis operations via the use of pull-down command menus, the present invention combines the convenience and familiarity features of a pull-down menu command structure with the ease of use features of a graphical programming environment.

In accordance with the present invention, a statistical analysis task is initiated by either creating a file which contains data representing a new GDFD or by retrieving a file containing data representing a previously created GDFD.

A new GDFD contains no elements, displayed as icons, representing data sets, graphs or other analysis. A GDFD element is automatically created by the computer interface of the present invention as the result of the selection of one or more commands from the pull-down menus to create a new data set, open an existing data set, or perform other activity such as creating a graph from a data set or performing statistical analysis of data. In this sense, there is generally a one to one correspondence between the implementation of a selected command and the generation of a GDFD element along with the graphical representation of the element and the functional dependencies between the new GDFD element and existing GDFD elements.

In the exemplary statistical analysis package embodiment, GDFD elements thus created may belong to one of three element types. The first permissible element type is a data set. Data sets are two-dimensional tabular displays of data values. Data sets may contain values directly entered by a user through an input device and/or a data set editor. Alternatively, data sets may reference data in external data sources such as databases located on one or more computers distributed throughout a computer network.

The second GDFD element type automatically generated by the statistical analysis package is an analysis element. Analysis elements are generated when an analysis module is invoked through a pull-down menu command to perform statistical analysis. Analysis elements represent a particular type of statistical analysis along with user specified parameters and options. In accordance with one embodiment of the present invention, each analysis element is represented by a unique GDFD icon. For example, when a regression analysis module is invoked to perform regression analysis on a data set, a unique icon representing the regression analysis module is automatically added as an analysis element to the GDFD.

The third type of GDFD element is the graph. Graph elements represent a particular graph that has been generated from a set of data values. A graph can be generated either directly from a data set, or as a result of an analysis task. A GDFD graph element is generated when a graph module is invoked by a command to generate a graph. In one embodiment of the present invention, each type of graph is assigned a unique icon. For example, line graphs are assigned one icon while box plots are assigned another.

Thus, a GDFD generated in accordance with the present invention can contain GDFD elements that correspond to data sets, analysis operations or graphs. Generally, data sets will be represented by the same basic icon while analysis operations and graphs will appear as GDFD elements represented by specific icons that correspond to the particular type of analysis performed or graph generated.

While the exemplary embodiment supports the creation of three types of GDFD elements, as many additional types of GDFD elements may be supported as desired, or required by any particular embodiment. For example, a derived data set element may be added to the exemplary embodiment to represent data sets which are selected subsets of existing data sets or a report element may be added, which combines selected information that can be derived from the other GDFD element types.

In accordance with another feature of the exemplary embodiment of the present invention, a brief identifier in the form of a text message is incorporated into each icon that represents an element in the GDFD. The text message is used to uniquely identify each icon and thus element in the GDFD. In the case of a data set element, the text message is used to identify the particular data set the element represents. In the case of graph and analysis elements, the text message is used to identify the particular type of graph or analysis operation the graph represents.

Generally, elements represented by icons in a GDFD are graphically linked according to the functional relationships that exist between the GDFD elements. A derived element, i.e., an element that was created from another element, is linked to the element from which it was created. In an exemplary embodiment of the present invention, links between GDFD elements are represented by arrows with each arrow starting from a source element and pointing to an element derived therefrom.

Links, like GDFD elements are created automatically as command operations selected from the command menus of the statistical analysis package of the present invention are performed. The links created between GDFD elements serve as records of the functional relationship and dependencies that exist between GDFD elements. These links are "live" which means that changes in the data of one GDFD element will be automatically reflected in the elements linked to it. Thus, in the case of a graph that is derived from a data set in the GDFD, changes to the data set will automatically result in corresponding changes being reflected in the graph.

Various restrictions are placed on the links that can be created between GDFD elements. These restrictions reflect the functional restrictions inherent in the commands that may be performed using data sets, analysis modules and graphs. For example, in the exemplary embodiment data from a data set or an analysis operation can be used to form a new data set. Thus, data set elements may be derived from data sets or analysis elements. When a data set is derived from another data set or analysis element, appropriate links are automatically generated originating from the source data or analysis element and terminating at the derived data set.

Similarly, graphs can be generated through selection of the appropriate graph commands, from either a data set or the output of an analysis operation. Accordingly, data sets and analysis elements may serve as sources for links to graph elements in a GDFD.

In the statistical analysis system of the present invention, analysis modules are limited to performing analysis operations only on data sets. Accordingly, an analysis element can only be derived from a data set.

Thus, only a data set can serve as a source of a link to an analysis element in a GDFD.

Rephrased another way, in accordance with the command structure of the present invention, a data set may serve as a source element for another data set, a graph, or an analysis operation. Furthermore, whenever a command is performed that generates a data set, a graph, or an analysis operation from a data set, the generated element will automatically be displayed as an icon in the GDFD linked to the source data set.

An analysis element may serve as a source element for a data set or a graph. Accordingly, whenever a command is performed that generates a data set or a graph from an analysis element, the statistical analysis package of the present invention generates a GDFD icon representing the generated data set or graph and links the source analysis element to the generated data set or graph.

In the exemplary embodiment, graph elements of a GDFD can not serve as source elements. Accordingly, no links from a graph element to another element can exist within a GDFD. Thus while graph elements represented by icons can be linked to other elements in the GDFD as represented by arrows leading from other elements to the graph element represent by a graph element, no arrows may leave a graph element.

It should be noted that the above examples of restrictions that are placed on the formation of links that can be created between GDFD elements are a direct function of the command structure which results in the automatic generation of the GDFD elements. Accordingly, by adding commands to the pull-down menus that support additional functional relationships with other commands, the types of links that will be permitted to be generated between GDFD elements will also be increased. For example, assuming commands permitting the generation of reports combining the contents of data sets, the output of analysis operations, and the result of graphics operations were added to the command menu of the data analysis package of the present invention, links from data, analysis and graphics elements to report elements would be permitted and automatically generated, as required, when a report command was selected.

While the present invention supports the display of GDFDs as graphical images comprising one or more GDFD elements represented as icons, alternative display and output formats are also supported. For example, in the exemplary embodiment, GDFDs may be displayed as text lists of GDFD elements. In such an embodiment, GDFD elements are identified by text names and are listed in conjunction with other relevant information, e.g., the GDFD element type and date of creation. GDFD elements listed as text may be sorted by, e.g., element type, GDFD element names, or date of creation.

The GDFDs generated by the statistical analysis program of the present invention can be stored as a data file for later retrieval, editing, and display. Thus, a user can continue a statistical analysis task by simply retrieving a stored GDFD file and continuing the analysis process.

Because the interface of the present invention generates a GDFD automatically in response to commands selected by a user, it need not be limited to the selection of commands from pull-down menus but may operate in response to commands, e.g., programming language or text commands, directly input by a user. Accordingly, in one embodiment of the present invention, a GDFD is automatically generated in response to programming commands used to initiate the data access, analysis, and/or graphics operations supported by the present invention.

While the GDFD of the present invention is normally generated automatically as the result of data access, statistical analysis, and/or graphics operations that are performed via the use of the pull-down menus, the statistical analysis package of the present invention also provides several manual graphical programming features. Such features include, e.g., the ability to copy, delete and add GDFD elements and to recombine the elements to modify the order in which statistical analysis and graphics operations are performed. Accordingly, while the statistical analysis package of the present invention does not require a user to perform any manual graphical programming to generate a GDFD, graphical programming is supported for those users who prefer such an environment.

Thus, the present invention combines the user convenience features of both a pull-down menu command environment with the convenience features of a graphical programming environment while eliminating the requirement that the user perform any graphical programming.

DETAILED DESCRIPTION

Figure 1:
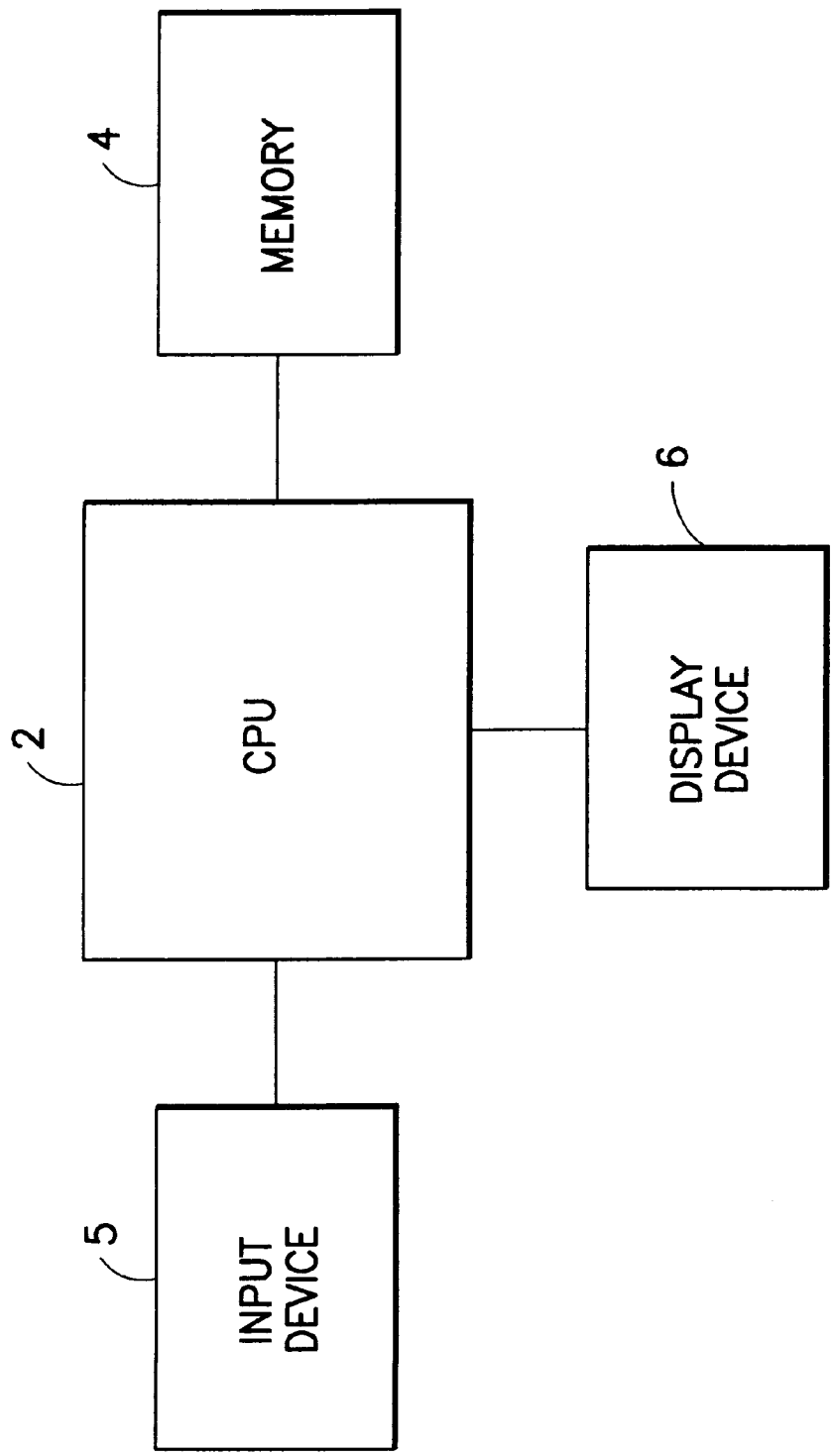
FIG. 1 is a block diagram illustrating the hardware used in the operation of the present invention.

Referring now to the drawings, and initially FIG. 1, there is illustrated in block diagram form the hardware used to operate the representative embodiment of the present invention. A central processing unit ("CPU") 2 is coupled to a memory device 4, an input device 5 and a display device 6. The CPU 2 can be, for example, a personal computer such as an IBM compatible personal computer, or a workstation, such as a Sun SPARC station. The input device 5 can be, for example, a keyboard and/or mouse, or any other device capable of receiving instructions from a user. The input device 5 may also be a link to another computer system or computer network, for, e.g., accessing data stored in one or more storage devices located at various locations within a computer network. The display device 6 can be any output device that is capable of displaying data to a user. For example, the display device 6 may be a computer graphics monitor. The memory 4 is used to stored the data operated upon by the present invention. The memory 4 may be secondary memory, such as a disk drive, or primary memory, such as RAM, or a combination of both.

Figure 2:
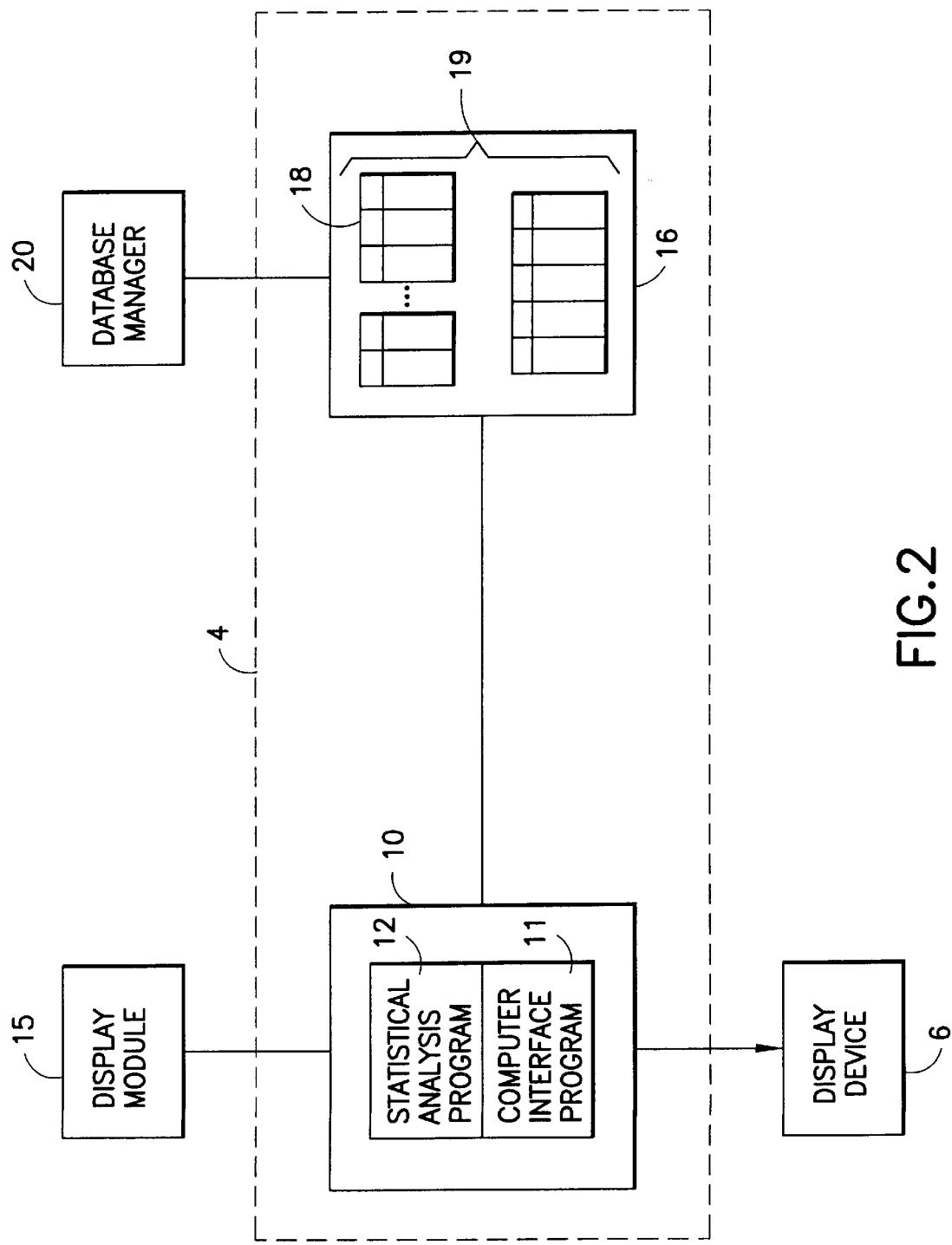
FIG. 2 is a block diagram of the structural relationship of the components of the present invention.

Turning now to FIG. 2, there is illustrated in block diagram form the structural relationship of the components of the present invention. A computer interface program 11, which may be part of, e.g., a statistical analysis program 12, is stored in a statistical analysis program segment 10 of memory. The operation of the statistical analysis program 12 is controlled by the computer interface program 11. A database 19, such as a relational database having a plurality of tables 18, is stored in a database segment 16 of memory. The management of the database 19 is controlled by, e.g., a database manager 20, as is known in the art.

The statistical analysis program segment 10 of memory and the database segment 16 of memory may both be located in the memory device 4. The statistical analysis program segment 10 of memory and the database segment 16 of memory may alternatively be stored on different memory devices 4, at different physical locations. The statistical analysis program segment 10 of memory and the database segment 16 of memory are structured differently. The database segment 16 of memory is structured in the form of database tables 18, as is known in the art. The statistical analysis program segment 10 of memory, which contains the computer interface program 11 of the present invention is structured as described below. The statistical analysis segment 10 of memory is coupled or linked to the database segment 16 of memory so that data can pass between the two segments. In this manner, under the control of the computer interface program 11, the statistical analysis program can access the data stored in the database segment 16 to create new data sets or to perform graphics or statistical analysis operations on data contained in the database segment 16 of memory.

A display module 15 controls the display of the GDFD and interface windows generated by the interface program 11 on the display device 6.

The windows, i.e., screen displays, generated by the interface program 11 can be displayed on the display device 6, as discussed in detail below. It is noted that the database 18 or selected portions thereof can also, where required, be displayed on the display device 6 as part of a statistical analysis program window generated by the interface program 11.

In the representative embodiment, the interface program 11 of the present invention and the database manager 20 are implemented in software. However, in alternative embodiments, they may be implemented in hardware or using other devices capable of carrying out a process.

Figure 3A:
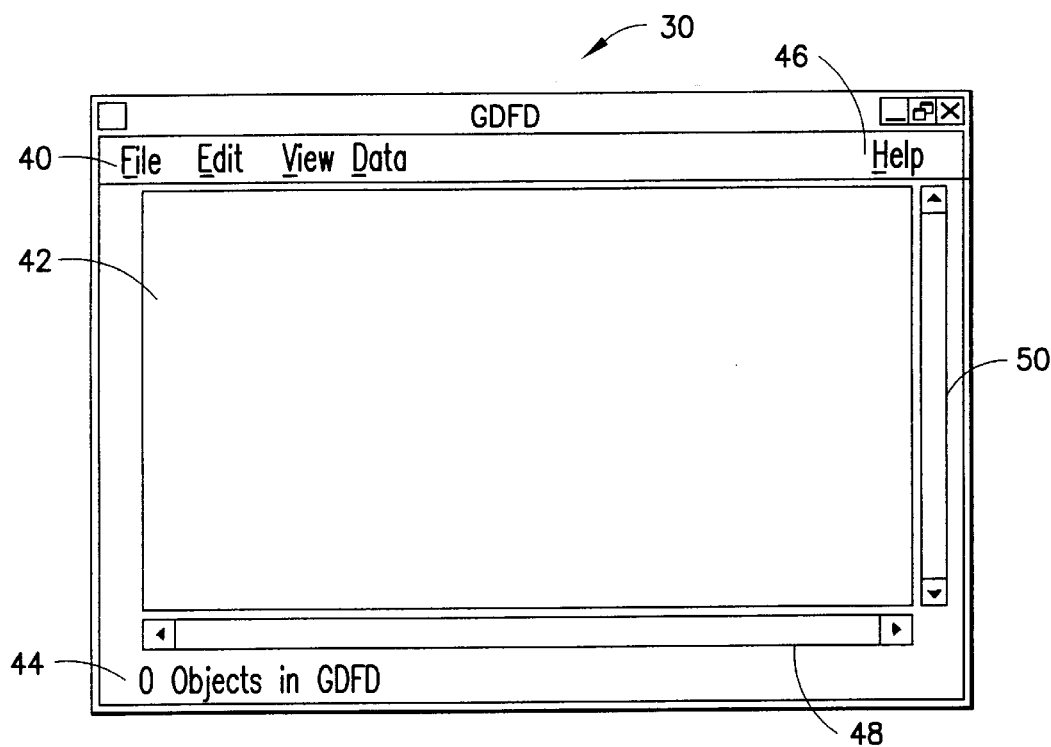
FIG. 3A is an illustration of a sample screen display of an opening window generated by one embodiment of the present invention.

Turning now to FIG. 3A, there is illustrated an exemplary screen display for the statistical analysis program 12 which incorporates the interface program 11 of the present invention. The opening window 30 of the statistical analysis program 12 is displayed upon start-up of the statistical analysis program 12. In the representative embodiment, the opening window 30 is a rectangular window comprising a menu bar 40, an on-line help command 46, a GDFD display area 42, a status line 44 and horizontal and vertical scroll bars 48, 50.

The menu bar 40, located horizontally along the top portion of the window 30 comprises a series of menu selection commands, e.g., File, Edit, View, and Data, for accessing a plurality of pull-down menus from which other commands may be selected, and the on-line Help Menu Selection Command 46. Methods for generating the window 30 and menu bar 40 are well known in the art. As with conventional pull-down menu systems, a user seeking to access one of the pull-down menus associated with the menu bar 40 or seeking to obtain on-line Help may do so by, e.g., typing the first letter of the appropriate menu selection command or by selecting the desired menu selection command through the use of an input device such as a mouse.

The on-line Help 46 may be selected by a user in the same manner as the menu selection commands available on the menu bar 40. The on-line Help 46 provides information on each of the available menu selection commands available via the menu bar 40. Methods for providing on-line Help, in response to selection of the on-line Help Command will be apparent to those skilled in the art.

The GDFD display area 42 is located beneath the menu bar 40. Within the GDFD display area 42, the elements that comprise a GDFD which is being accessed or operated on at any give time are displayed as icons. Because the window 30 illustrated in FIG. 3A is the opening window, it contains no GDFD elements. The status line 44, located at the bottom left hand portion of the window 30, displays the number of elements in the GDFD at any given time. Accordingly, the status line of FIG. 3A indicates that there are zero elements in the GDFD.

When a GDFD is created or retrieved, through the use of one or more of the commands available via the menu bar 40, GDFD elements will be automatically added to the GDFD display area 42 and, the status line 44 will be updated accordingly under control of the interface program 11 of the present invention.

The horizontal scroll bar 48 and the vertical scroll bar 50 are located adjacent the bottom and right hand edges of the GDFD display area 42, respectively. When a GDFD is too large to be displayed in the GDFD display are 42, the scroll bars are used to control the portion of the GDFD that will be displayed at any given time.

Figure 3B:
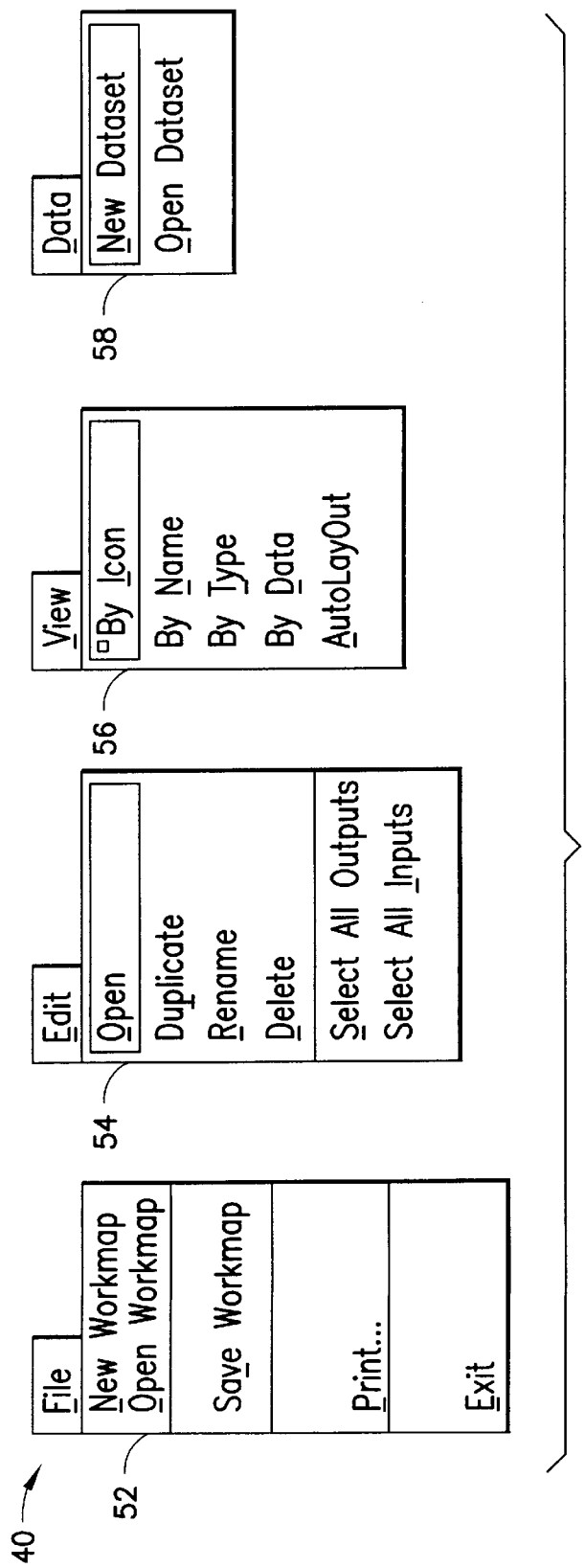
FIG. 3B is an illustration of the pull-down menus available from the window illustrated in the screen display of FIG. 3A.

Referring now to FIG. 3B, the menu bar 40 of FIG. 3A is displayed along with a series of pull-down menus 52, 54, 56, 58 that can be accessed by selecting one of the menu selection commands from the menu bar 40. The File pull-down menu 52 comprises a series of commands for creating new GDFD files, for retrieving, i.e., opening existing GDFD files and for closing and saving GDFD files. In addition, the File pull-down menu 52 contains additional commands, e.g., Print, and Exit, for printing GDFDs and for exiting from the statistical analysis program 12. As will be discussed below, the interface program 11 of the present invention is responsive to the File Commands to generate, retrieve, save, print, and/or exit a GDFD.

The Edit pull-down menu 54 comprises a series of commands for editing GDFDs and creating GDFD elements by, e.g., duplicating elements in an existing GDFD. The Edit pull-down menu contains an Open command for opening selected GDFD elements, a Duplicate command for duplicating selected GDFD elements, a Rename command for renaming selected GDFD elements, and a Delete command for deleting selected GDFD elements. In addition, the Edit pull-down menu 54 comprises a Select All Outputs command and a Select All Inputs command for selecting outputs and inputs of a GDFD element to be combined with another GDFD element for, e.g., duplicating a set of workmap elements. The interface program 11 of the present invention is responsive to Edit menu 54 commands to automatically perform the specified operations on the selected GDFD elements and to update the links between the GDFD elements as well as the GDFD display area 42 to reflect the changes made to the GDFD.

The View pull-down menu 56 comprises a series of commands for controlling the display format of the GDFD. Selection of either the By Icon or By Small Icon command results in the elements comprising the GDFD being displayed using either normal size icons or small size icons. Examples of the various GDFD display formats supported the interface program of the present invention will be discussed further with regard to FIGS. 5A through 5F.

In addition to displaying the GDFD using Icons, it is possible to display the GDFD as a text listing of GDFD elements using one of the text display format commands, i.e., By Name, By Type, or By Date, which are part of the View pull-down menu 56. When one of these GDFD text display formats are selected, elements comprising the GDFD are displayed as a text list arranged according to GDFD element name, GDFD element type, or date of GDFD element creation, depending on the selected text display format command.

The View pull-down menu 56 further comprises an Auto Layout command for selecting between automatic arrangement of GDFD elements in the GDFD display area 42 and the manual control of GDFD element arrangement.

The Data pull-down menu 58 comprises a New Data set command for creating new data sets and an Open Data set command for opening existing data sets. Once a new data set has been created or an existing data set is retrieved, the interface program of the present invention displays a data set editor window in addition to the GDFD window.

Figure 4A:
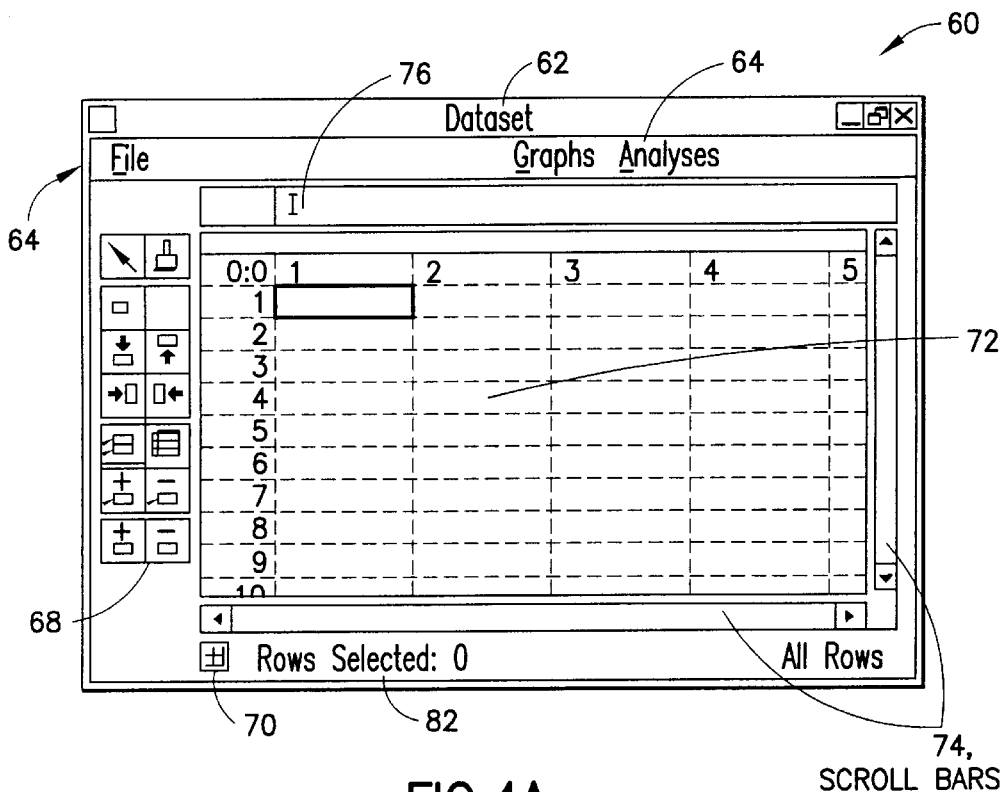
FIG. 4A is an illustration of a screen display representing a data set window generated by the present invention.

Referring now to FIG. 4A, there is displayed an exemplary screen display of the present invention comprising a rectangular window 60. The data set window 60 is used for displaying data sets, e.g., when the New Data set or Open Data set command is selected from the Data pull-down menu 58. A user may select commands from either the GDFD window 30 or the data set window 60 with the window which is selected at any given time, e.g., by clicking on the window, being designated as the active window 30, 60.

The data set window 60 comprises a data set identifier box 62 centered at the top of the window for displaying the name of the data set being displayed and a menu bar 64 located beneath the data set identifier box 62 for listing menu selection commands. The data set window 60 further comprises a text edit box 76 which is displayed on a line beneath the menu bar 64.

A tool palette 68 containing a plurality of tools for editing and marking data that is displayed in the data set window is positioned on the left hand side of the window 60. To the right of the tool palette 68 is displayed a viewport 72 wherein the data set is displayed as a two dimensional set of cells. Scroll bars 74 may be used to control the particular portion of the data set that is displayed at any given time. Each column in the viewport 72 represents a different group or subset of data which may be selected for use in data graphing or analysis operations.

Figure 4B:
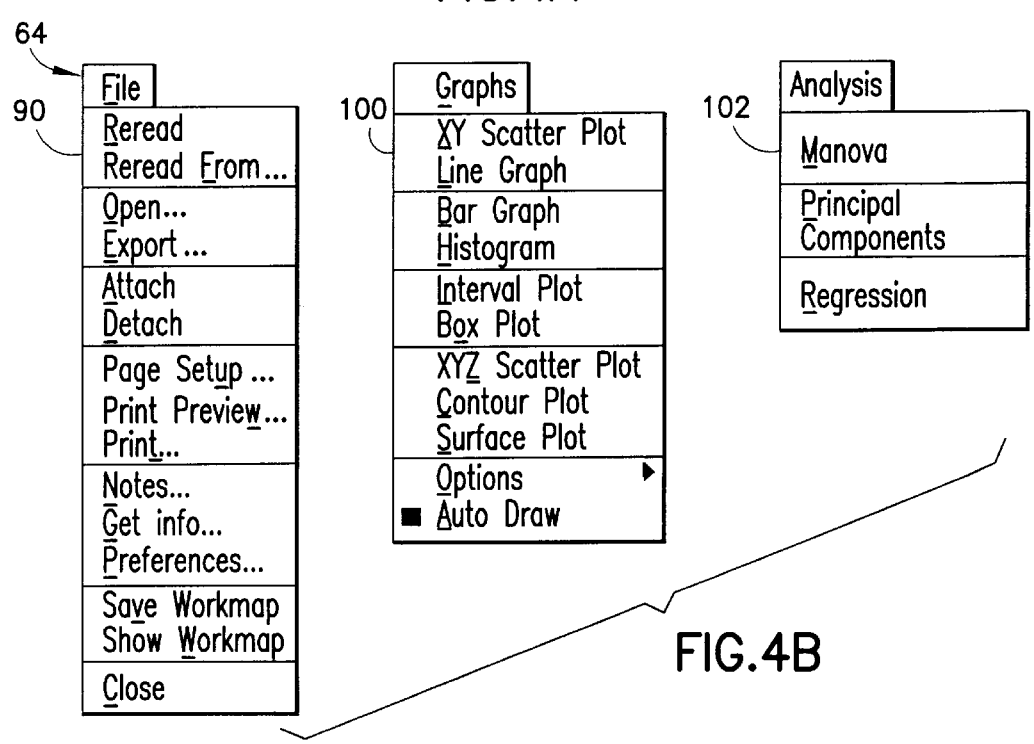
FIG. 4B is an illustration of the pull-down menus available from the menu bar illustrated in FIG. 4A.

Positioned at the bottom of the data set window 60 is a status line 82 for, e.g., indicating which columns of the data set have been selected for an analysis or graphics operation. Referring now to FIG. 4B there is displayed a plurality of pull-down menus 90, 100, 102 which may be accessed by selecting one of the corresponding menu selection commands from the menu bar 64 of FIG. 4A. The File pull-down menu 90 comprises a series of commands for accessing and saving data as well as GDFD files.

The exemplary Graphs and Analysis pull-down menus 100, 102 are also displayed in FIG. 4B. The Graphs pull-down menu comprises a plurality of graph commands that are associated with various graph types, e.g., XY Scatter Plot, Line Graph, Bar Graph, Histogram, Interval Plot, Box Plot, etc. The Graphs pull-down menu may also provide an Options command which permits a user to select, e.g., graph titles and legends.

Similarly, the Analysis pull-down menu 102, comprises a series of analysis commands representing various types of analysis that can be performed on the data set, e.g., Manova analysis, Principal Components analysis, and Regression analysis. In the exemplary embodiment, each different type of analysis may be performed by a separate optional program module. For example, the Manova command may invoke an optional module for comparing two or more data groups on the basis of measurements on two or more continuous responses to determine whether there are differences between the groups. The Principal Components command may invoke a module that determines the principal components of a set of data containing a number of different original variables, the principal components being derived, uncorrelated variables that are sorted in order of decreasing variance. The Regression command may be used to invoke a module that analyzes the relationships between a response variable and one or more predictor variables to generate a mathematical model that explains how changes in the values of the predictor variables affect the values of the response variable. As will be discussed below, the interface program 11 of the present invention is responsive to the selection of commands from the Graphs and Analysis menus 100, 102 to automatically generate GDFD elements represented by icons and to add or delete such elements from the GDFD with the appropriate links representing the created elements functional relationship with other elements in the GDFD.

A user may specify the type of graph to be created or the type of analysis to be performed by selecting the data to be graphed or analyzed prior to selecting the appropriate command from the Graphs and/or Analysis pull-down menus 100, 102 of the data set window 60. Such data and/or command selections may be made by, e.g., keyboard input or a mouse click on the appropriate portion of the data set window 60.

In accordance with the statistical analysis program 12 embodiment of the present invention, the opening GDFD window 30 is displayed upon the initialization of each new statistical analysis program session. To perform a desired statistical analysis task, a user selects commands from the pull-down menu 102 illustrated in FIG. 4B. As will be described in greater detail below, as commands are performed, the statistical analysis program 12 of the present invention automatically generates a GDFD for future reference. In accordance with the interface program 11 of the present invention, commands from the pull-down menus 52, 54, 56, 58 are only enabled when the command can be performed and the appropriate GDFD element reflecting the operation generated. For example, the graphs menu 100 and commands contained therein, will only be active when a data set containing data that can be graphed has already been created or retrieved.

The automatic generation of a GDFD according to the present invention will now be generally described with references to FIGS. 5A through 5F and an exemplary statistical analysis session.

Generally, a data analysis task begins with either the creation of a new GDFD by selection of the New GDFD command from the File pull-down menu 52 or by retrieving an existing GDFD by selecting the Open GDFD command from the File pull-down menu 52. Once a GDFD is created, the analysis task generally proceeds to the step of importing a data set or generating a data set. An existing data set may be imported into the GDFD using the Open Data set command from the Data pull-down menu 58. Alternatively, a new data set may be created using the New Data set command available from the same pull-down menu.

Figure 5A:
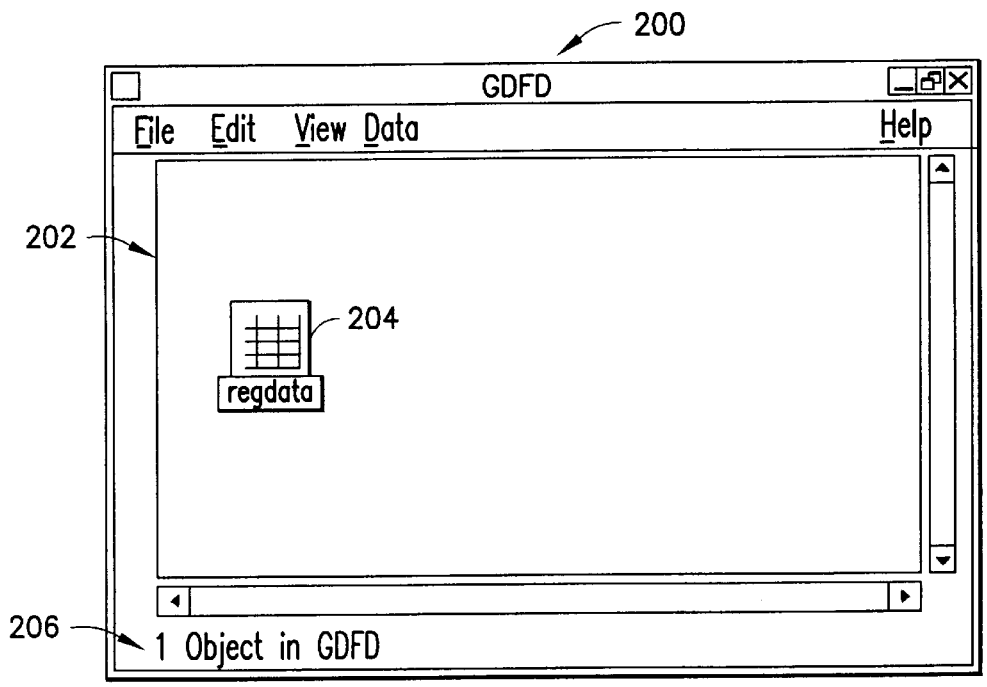
FIGS. 5A to 5F are additional examples of screen displays of the present invention.

Referring now to FIG. 5A there is illustrated a GDFD window 200 which comprises a display area 202 and a status line 206. Status line 206 at the bottom of the GDFD display area 202 indicates the number of GDFD elements contained in the GDFD being displayed in the GDFD display area 202. FIGS. 5C and 5E are illustrations of additional GDFD windows with elements the same as or similar to, the elements of FIG. 5A being referred to using the same reference numerals.

Referring once again to the GDFD window 200 of FIG. 5A, the display area 202 contains a single GDFD element 204 representing a data set GDFD element that was automatically generated by the interface program 11 in response to the selection of, e.g., the Open Data set command to retrieve the existing data set named, e.g., "Regdata1". The status line 206 at the bottom of the GDFD display area 202 indicates that the GDFD contains 1 element, i.e., the Regdata data set 204.

Figure 5B:
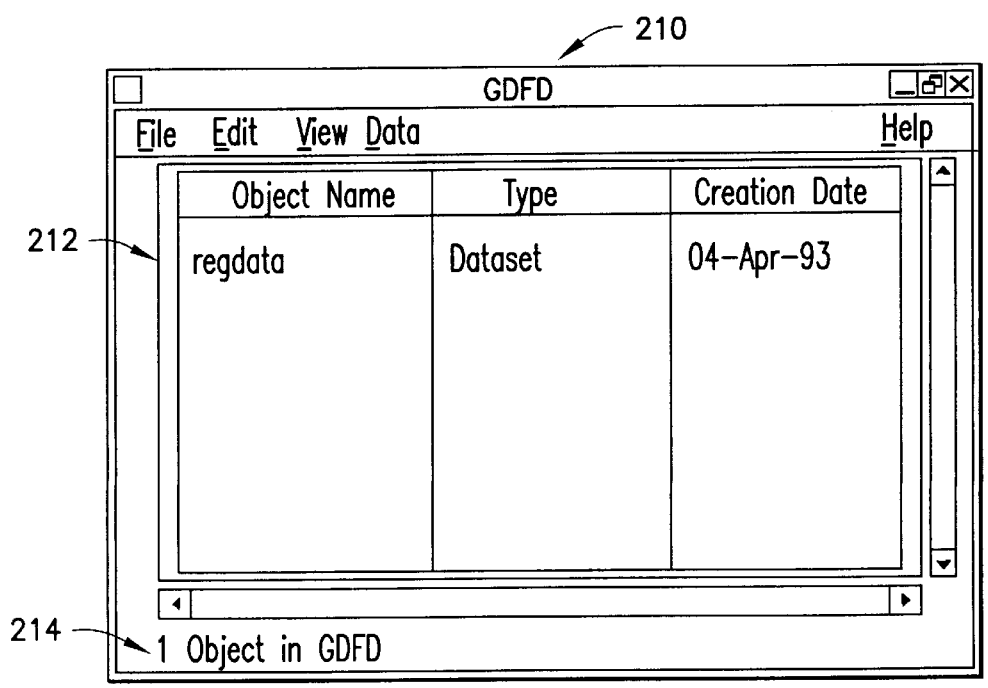
Figures 5C, 5D:
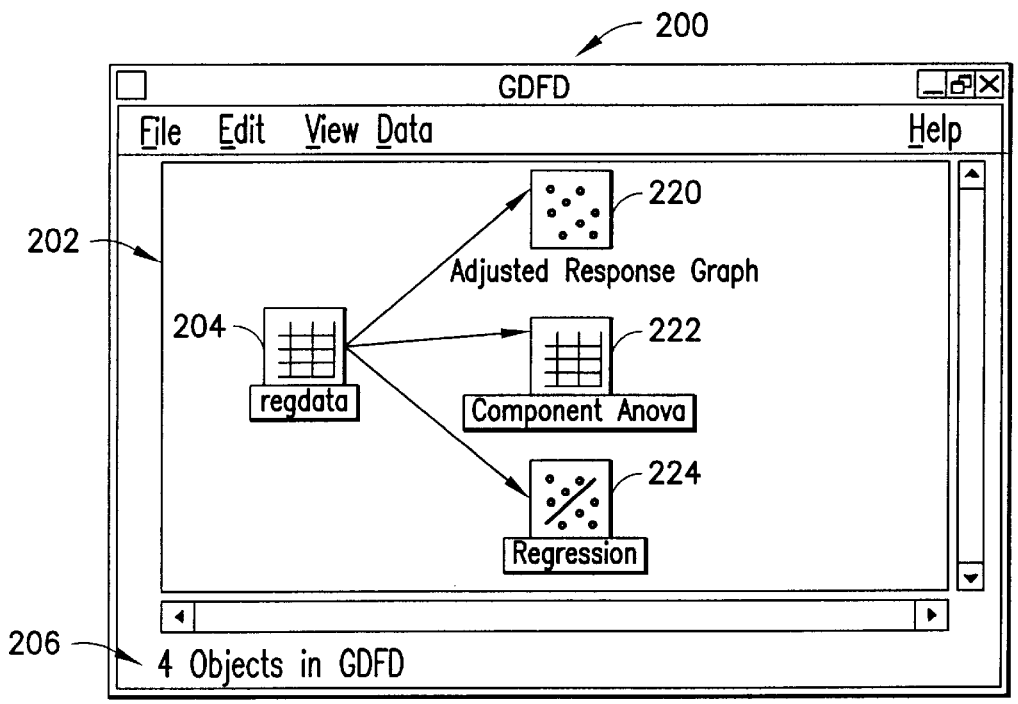
Figures 5E, 5F:
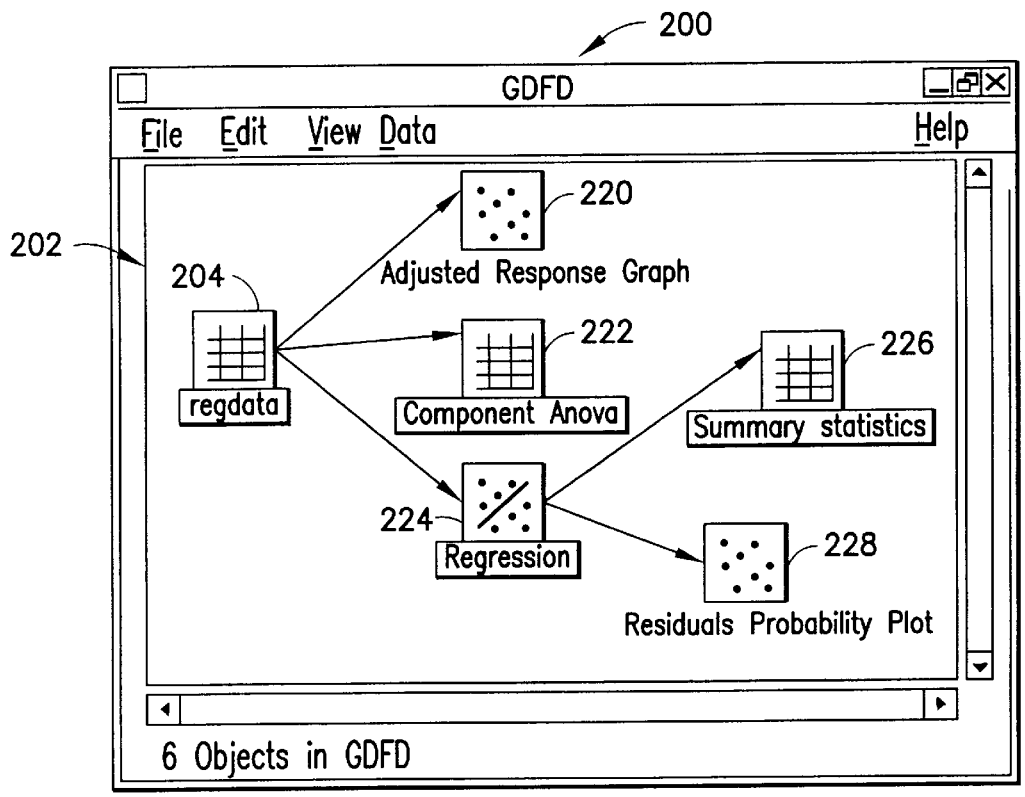

FIG. 5B is an alternate display of the GDFD that is displayed graphicly using normal size icons in FIG. 5A. FIG. 5B illustrates the format of the GDFD display generated by the interface program 11 when the By Type display format is selected from the View pull-down menu 56. As illustrated in FIG. 5B a GDFD window 210 comprises a GDFD display area 212 and a status line 214 as in FIG. 5A. However, in FIG. 5B, the GDFD is displayed as a text list as opposed to one or more icons. Furthermore, in the text list, GDFD elements are identified by name, element type, and date of creation.

From the data set pull-down menus 90, 92, 94, 96, 98, 100, 102 various commands may be selected to generate graphs, additional data sets, and/or to perform statistical analysis using data from an existing GDFD data set. For example, a graph may be generated by designating data, e.g., columns of data, each representing a different group or type of information, in the Reqdata data set to be used in a scatter plot and by selecting the XY Scatter Plot from the Graphs pull-down menu 100. The selection of a Graphs menu command causes the interface program 11 of the present invention to automatically generate a graph GDFD element, e.g, an adjusted response graph GDFD element 220, as illustrated in FIG. 5C with an arrow representing the function link between the Regdata data set 204, and the adjusted response graph GDFD element 220.

In addition to generating graphs from data sets, additional data sets may be generated from a data set through the selection of additional commands.

Furthermore, statistical analysis may be performed on a data set.

For example, a new data set may be generated from the data contained in the Regdata data set 204 illustrated in FIG. 5A to create a new data set titled Component Anova. In addition, the Regression command from the Analysis pull-down menu 202 may be selected to perform regression analysis on the data contained in the Regdata data set 202. When the new data set is created and the regression analysis is performed, as the result of the selection of commands from the pull-down menus, the interface program 11 of the present invention automatically generates corresponding GDFD elements as illustrated in FIG. 5C with links to show the data set from which the new GDFD elements 222, 224 were generated.

Thus, as illustrated in FIG. 5C when the adjusted response graph is generated, a corresponding graph element represented by the Adjusted Response Graph element 220 is added to the GDFD. An arrow from the Regdata data set element 204 to the Adjusted Response Graph element 220, represents a functional link between the two GDFD elements and indicates that the Adjusted Response Graph was derived from the data contained in the Regdata data set 204.

Similarly, when the Component Anova data set is generated, a corresponding element 222 is automatically added to the GDFD by the interface program 11. An arrow from the Reqdata data set element 204, to the Component Anova data set element 222, indicates that the Component Anova data set was derived from the Regdata data set 204. The Regression element 224 is also automatically generated as the result of the regression analysis performed on the data in the Regdata data set. An arrow linking the Regdata data set 204 to the Regression element 224 illustrates the dependency of the regression analysis on data contained in the Regdata data set.

Referring now to FIG. 5D, the GDFD of FIG. 5C is illustrated as a text list of GDFD elements. As illustrated, the GDFD contains 4 elements which are arranged alphabetically according to element type. It should be noted that the interface program of the present invention automatically generates a unique text name for each element contained in a GDFD.

Thus, the regression results represented by the Regression element 224 of FIGS. 5C and 5E can be used to generate a data set represented by, e.g., a Summary Statistics data set element 226 and a graph represented by, e.g., a Residuals Probability Plot graph element 228. Such a possibility is reflected in the GDFD of FIG. 5E which illustrates the Regression data analysis element 224 being linked to the Summary Statistics element 226 and the Residuals Probability Plot element 228 by arrows.

The GDFD of FIG. 5E is illustrated in a text list format in FIG. 5F. As illustrated, the GDFD of FIGS. 5E and 5F contain 6 GDFD elements, five of which are derived directly or indirectly from the Regdata data set as evidenced by the graphical arrows or links generated between the GDFD elements illustrated in FIG. 5E.

Unlike data sets and statistical analysis operations, in the exemplary embodiment, graph operations can not provide data to create additional graphs, to perform statistical analysis, or to create new data sets. Accordingly, all graph elements in a GDFD, i.e., the Adjusted Response Graph element 220 and the Residuals Probability Plot Element 228, are leaf elements, e.g., elements which can not serve as a source of a link to another element.

Figure 6A:
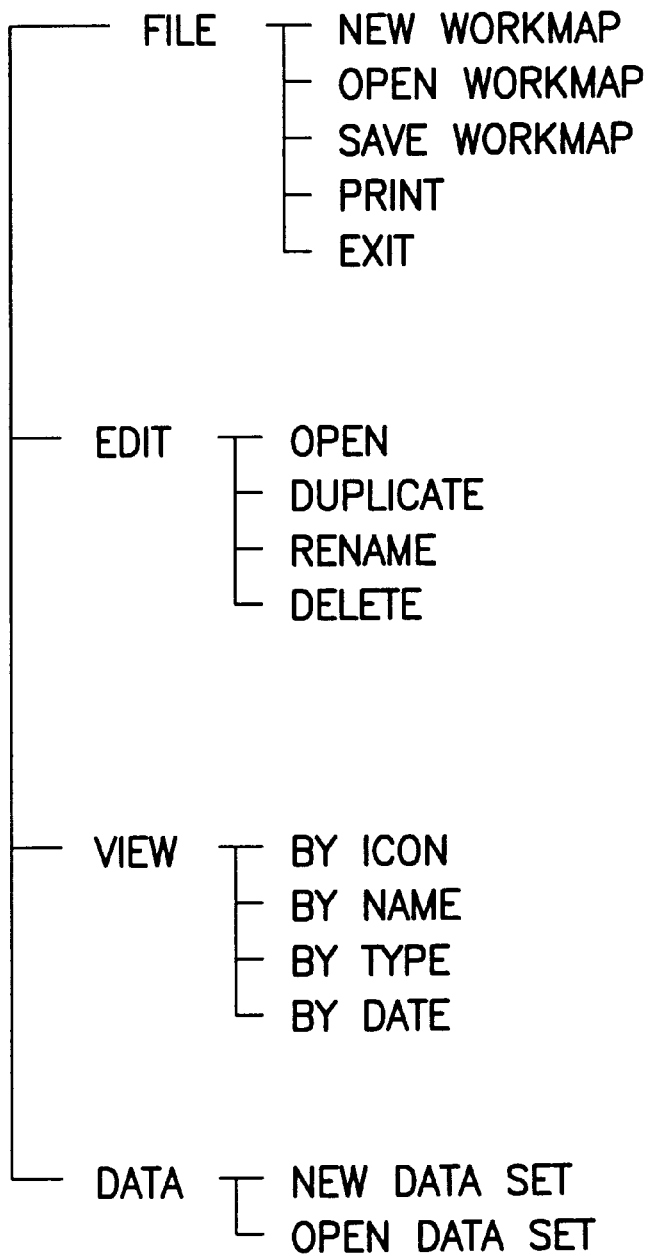
FIG. 6A is a tree structure diagram showing the hierarchical command structure of the command menu and submenus available from the menu bar illustrated in FIG. 3A.
Figure 6B:
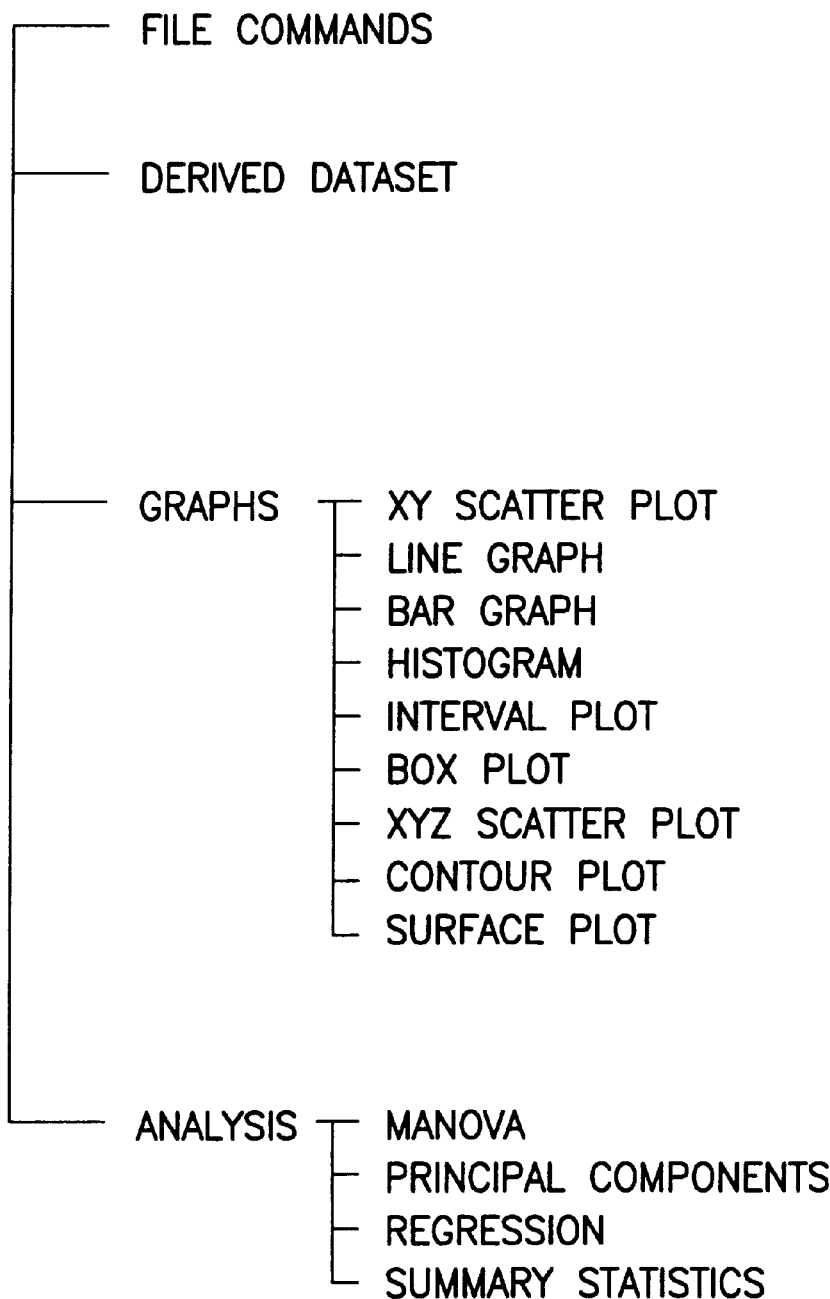
FIG. 6B is a tree structure diagram showing the hierarchical command structure of the data set command submenu illustrated in FIG. 4A.

Referring now to FIG. 6A there is illustrated a tree structure diagram showing the hierarchical command structure of the top level GDFD interface commands menu and immediate submenus available from the GDFD window. Similarly, FIG. 6B illustrates a tree structure diagram showing the hierarchical command structure of the data set submenu. As will be discussed further below, when a user selects one of the commands from any one of the command menus, the selected command is parsed to determine the appropriate command function to call. In accordance with the present invention, the interface program 11 then calls the corresponding command function while passing the command function a pointer to the active Window element, e.g., the GDFD window or data set window, from which the command was selected.

Figure 7:
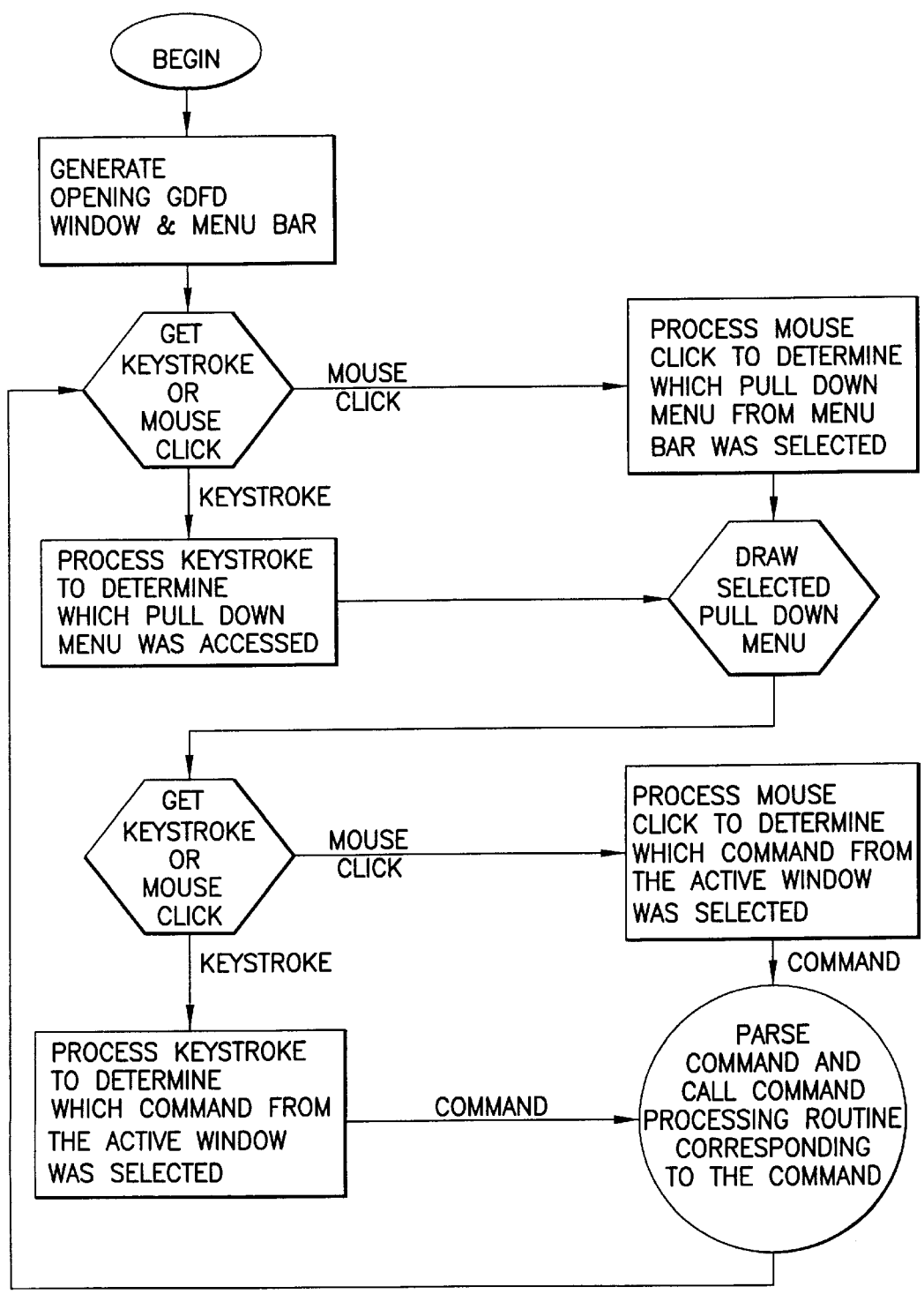
FIG. 7 is a flow chart illustrating the flow of control of a representative embodiment of the present invention.

Referring now briefly to FIG. 7, there is illustrated a high level flow chart illustrating the flow of control of a representative embodiment of the interface program 11 of the present invention. As is known in the art, a circle in the flow chart is a reference to functionality that is described in greater detail elsewhere, e.g., in the pseudo code and explanation set forth below. Differences between the pseudo-code set forth below and the flow chart of FIG. 7 merely highlights that the present invention can be implemented using various software techniques. The flow chart of FIG. 7 is self-explanatory to a person skilled in the art.

The pseudo-code and the flow chart of FIG. 7 do not describe in detail all the command menu, help menu, dialogue box and windowing features of the present invention. Such features which are not explained in detail are well known in the art. Furthermore, the present invention includes features, such as saving window locations so that they do not have to be continuously recalculated, as well as window size and appearance features that are well known in the art.

Major objects used to implement the GDFD feature of the interface program 11 of the present invention, and the methods available to make inquiries and perform actions on these GDFD objects will be described below with pseudo code being provided for each method. These major objects may be thought of generally as a group of modules which comprise the interactive user interface program 11.

The pseudocode assumes the availability of dynamic arrays and dictionaries as prerequisite mechanisms. These mechanisms could be constructed from simpler components using well known programming techniques if they are not readily available.

The pseudocode assumes the availability of a mechanism whereby a given object embodied in the code has an initially empty "update notification" list of pointers to other objects that should have their "updateNotify" method called when the given element changes state. These notification calls can be used to update calculations such as analysis or summary statistics calculations and the corresponding objects to reflect changes in source data, or to trigger redisplay of an updated view of changed element data. Note that GDFD elements are a particular type of object in this context. Such notifications appear in the pseudocode as statements having the form of:

Notify element's update dependents that . . .

The pseudocode set forth below assumes the availability of an exception handling mechanism that supports raising named "exceptions" which can be caught by dynamically scoped exception handlers. One embodiment of the present invention uses C++ exception handling to check for and handle exceptions inside the method implementations. To implement the present invention using a language in which an exception raising mechanism is not available, the methods could return error status codes, or responsibility for avoiding error conditions could be delegated to callers of these methods rather than the methods themselves.

Since methods of generating and displaying windows via the use of Window objects, Window object classes and subclasses are known to those skilled in the art, for purposes of describing the interface program 11 of the present invention, the Window object and Window object classes and subclasses that are used to generate and display windows will not be discussed in detail. For discussion purposes, in the pseudo code that follows, the functionality of the Window object and Window object classes and subclasses that work together to handle the display of the windows and window editor functionality will be posited on a Window object that performs the required window display functions.

In the pseudo code for the interface program 11, set forth below, reference will be made to the following Window methods:

GDFD( )—returns GDFD: returns the GDFD associated with this Window object; raises an exception if this Window is associated with an Element rather than a GDFD.

element( )—returns Element: returns the Element associated with this Window object; raises an exception if this Window is associated with a GDFD rather than an Element.

selection( )—returns array of Objects: returns the objects currently selected by the user in the window, for example by clicking on them. Among the objects that can be selected are Elements of GDFDs and Columns of DatasetElements.

The above Window methods are used by the pseudo code of the interface program 11 set forth below.

In the exemplary embodiment, the GDFD feature of the interface program 11 is modeled using two basic types of objects, GDFD objects and Element objects. While a single GDFD object is used in one exemplary embodiment of the present invention, the design of the interface of the present invention is general enough to support multiple independent GDFDs (representing independent analysis, comparing analysis paths, etc.), and also nested GDFDs, allowing a GDFD to be an element in a GDFD, potentially recursively through multiple levels.

As discussed briefly above, and as illustrated in FIG. 7, after parsing a user selected command the interface program 11 calls the appropriate command function to implement the selected command while passing the command function a pointer to the active Window object from which the command was selected.

Set forth below are descriptions of pseudo code for implementing the parsing routine, command functions, GDFD objects, and Element objects used to implement the GDFD feature of the interface program 11.

Generally, in the pseudo code set forth below, indentation is used to show the scope of control structures, e.g., if statements. Commas are generally used to represent the end of a statement except when used in conjunction with explanatory clauses. In addition, periods are generally used within the pseudo code to represent the end of a function or method.

The parsing of the selected command and the calling of the appropriate command function may be implemented, e.g., using a case statement.

Case Statement Pseudocode
   Get COMMAND selected by keystroke or mouse click If
      COMMAND=
      New GDFD:
         newGDFDCmd(window)
      Open GDFD:
         openGDFDCmd(window)
      Save GDFD:
         saveGDFDAsCmd(window)
      Print:
         printGDFDCmd(window)
      Exit:
         exitGDFDCmd(window)
      Open:
         openElementGDFDCmd(window)
      Duplicate:
         duplicateElementGDFDCmd(window)
      Rename:
         renameElementGDFDCmd(window)
      Delete:
         deleteElementGDFDCmd(window)
      By Icon:
         viewByIconCmd(window)
      By Name:
         viewByNameCmd(window)
      By Type:
         viewByTypeCmd(window)
      By Date:
         viewByDateCmd(window)
      New Data set:
         newDatasetCmd(window)
      Open Dataset:
         openDatasetCmd(window)
      Derived Data set:
         derivedDatasetCmd(window)
      XY Scatter Plot:
         XYScatterplotCmd(window)
      Line Graph:
         lineGraphCmd(window)
      BarGraph:
         barGraphCmd(window)
      Histogram:
         HistogramCmd(window)
      Interval Plot:
         intervalPlotCmd(window)
      Box Plot:
         boxPlotCmd(window)
      XYZ Scatter Plot:
         xyzScatterPlotCmd(window)
      Contour Plot:
         contourPlotCmd(window)
      Surface Plot:
         surfacePlotCmd(window)
      Manova:
         manovaCmd
      Principal Components:
         princocmd
      Regression:
         regressionCmd
   Each of the command functions that may be called as a result of the selection of commands from the pull-down command menus will be described below. Following the general description of each command function and its operation is pseudocode which may be used to implement the command function.
      newGDFDCmd(window): if current GDFD is not empty, asks user for confirmation. Current GDFD is then cleared from memory leaving a newly empty GDFD.

Pseudocode:
Set tmpGDFD to value returned by call to window's GDFD( ) method,
   Set tmpElementCount to value returned by call to tmpGDFD's elementCount( ) method,
   If tmpElementCount is greater than zero,
      Set tmpConfirmation to value returned by asking user to confirm that current GDFD contents should be discarded,
   Else
      Set tmpConfirmation to True,
   If tmpConfirmation is True,
      Call tmpGDFD's deleteAllElements( ) method.
openGDFDCmd(window): if current GDFD is not empty, asks user for confirmation that it should be discarded. A dialog box is then presented that lets the user specify which saved GDFD file they want to open, and when the dialog box returns, the specified file is opened:
Pseudocode:
Set tmpGDFD to value returned by call to window's GDFD( ) method,
   Set tmpElementCount to value returned by call to tmpGDFD's elementCount( ) method,
   If tmpElementCount is greater than zero,
      Set tmpConfirmation to value returned by asking user to confirm that current GDFD contents should be discarded,
   Else
      Set tmpConfirmation to True,
   If tmpConfirmation is True,
      call tmpGDFD's deleteAllElements( ) method, Display modal dialog box window in which user can select filepath for a previously saved GDFD,
      Set tmpFilepath to value returned by modal dialog box after user dismisses it by clicking OK button or equivalent,
      Call tmpGDFD's open(tmpFilepath) method.
saveGDFDASCmd(window): A dialog box is presented that lets the user specify where the current GDFD should be saved as a file, and when the dialog box returns, the GDFD is saved to the file:
Pseudocode: Set tmpGDFD to value returned by call to window's GDFD( ) method,
   Display modal dialog box window in which user can specify filepath where current GDFD will be saved, Set tmpFilepath to value returned by modal dialog box after user dismisses it by clicking OK button or equivalent,
   Call tmpGDFD's save(tmpFilepath) method.
printGDFDCmd(window): A dialog box is presented that lets the user specify or confirm where and how the GDFD should be printed, and the printing is done:
Pseudocode:
Set tmpGDFD to value returned by call to window's GDFD( ) method,
   Display modal dialog box window in which user can specify details of where and how the GDFD will be printed,
   Set tmpPrintDetails to value returned by modal dialog box after user dismisses it by clicking OK button or equivalent,
   Call tmpGDFD's print(tmpPrintDetails) method.
GDFDCmd(window): If GDFD has been modified, ask user about saving the GDFD before exiting, then exit the program; the GDFD can keep track of whether it has been modified by having a mymodified field and having all methods that modify it set the myModified field, and having the save methods clear it; these details aren't shown here. Furthermore, neither are the details of remembering the filepath from a previous GDFD save so it can be used in the Exit (or Save) command:

Pseudocode:

Set tmpGDFD to value returned by call to window's GDFD( ) method,

If tmpGDFD has been modified,
  Set tmpConfirmation to value returned by asking user to confirm that current GDFD contents should be saved,
Else
  Set tmpConfirmation to False,
If tmpConfirmation is True,
  call tmpGDFD's save(tmpFilepath) method,
Exit from the program, after calling any termination routines needed to free system resources.

openElementGDFDCmd(window): This command is only enabled in the GDFD's Edit menu when exactly one Element is selected. It causes an editor window to open up showing the selected Element:

Pseudocode:

Set tmpElementArray to value returned by call to window's selection( ) method, Set tmpElement to first element of tmpElementArray, Call tmpElement's openEditor( ) method.

duplicateElementGDFDCmd(window): This command is only enabled in the GDFD's Edit menu when at least one Element is selected:

Pseudocode:

Set tmpGDFD to value returned by call to window's GDFD( ) method,

Set tmpElementArray to value returned by call to window's selection( ) method,

Call tmpGDFD's duplicateElements(tmpElementArray) method.

renameElementGDFDCmd(window): This command is only enabled in the GDFD's Edit menu when exactly one Element is selected. A dialog box is then presented that lets the user enter the new name for the element, and when the dialog box returns, the selected element is renamed:

Pseudocode:

Set tmpElementArray to value returned by call to window's selections () method,

Set tmpElement to first element of tmpElementArray,

Display modal dialog box window in which user can enter the new element name,

Set tmpName to value returned by modal dialog box after user dismisses it by clicking OK button or equivalent, Call tmpElement's rename(tmpName) method.

deleteElementGDFDCmd(window): This command is only enabled in the GDFD's Edit menu when exactly one Element is selected. The user is asked to confirm the deletion before the element and its output elements, if any, are deleted:

Pseudocode:

Set tmpElementArray to value returned by call to window's selection( ) method,

Set tmpElement to first element of tmpElementArray,

Set tmpConfirmation to value returned by asking user to confirm that the selected element (and any output elements) should be deleted, If tmpConfirmation is true,
  Call tmpElement's deleteElement( ) method.

viewByIconcmd(window): This command selects the graphical icon view of the GDFD in its editor window:

Pseudocode:

Call window's viewByIcon( ) method.

viewByNameCmd(window): This command selects a tabular view of GDFD elements sorted by name in the GDFD's window:

Pseudocode:

Call window's viewByName( ) method.

viewByTypecmd(window): This command selects a tabular view of GDFD elements sorted by element type in the GDFD's window:

Psuedocode:

Call window's viewByType( ) method.

viewByDateCmd(window): This command selects a tabular view of GDFD elements sorted by creation date in the GDFD's window:

Pseudocode:

Call window's viewByDate( ) method.

newDatasetCnd(window): This command creates a new empty data set with default name, and opens an editor window on it:

Pseudocode:

Set tmpGDFD to value returned by call to window's GDFD( ) method,

Set tmpDatasetElement to newly constructed data setElement(tmpGDFD, "Dataset"),

Call tmpDatasetElement's openEditor( ) method.

openDatasetCmd(window): This command displays a modal dialog box in which the user can specify the data set to be opened, and when the dialog box returns, creates a new data set element containing the specified data, and opens an editor window on it:

Pseudocode:

Set tmpGDFD to value returned by call to window's GDFD( ) method,

Display modal dialog box window in which user can specify details of which data set should be opened, Set tmpDatasetDetails to value returned by modal dialog box after user dismisses it by clicking OK button or equivalent, Set tmpDatasetElement to newly constructed data setElement(tmpGDFD, "Data set", tmpDatasetDetails), Call tmpDatasetElement's openEditor( ) method.

derivedDatasetCmd(window): This command on the Data setElement window displays a modal dialog box in which the user can specify which columns and rows of the current data set should be displayed in the derived data set.

Pseudocode:

Set tmpDatasetElement to value returned by call to window's element( ) method,

Display modal dialog box window in which user can specify details of which columns and rows of the data settlement should be included, Set tmpColRowDetails to value returned by modal dialog box after user dismisses it by clicking OK button or equivalent, Set tmpDerivedDatasetElement to newly constructed derivedDatasetElement(tmpDatasetElement, "Derived Data set", tmpColRowDetails), Call tmpDerivedDatasetElement's openEditor( ) method.

xyScatterplotCmd(window): This command on the Data setElement window displays a modal dialog box in which the user can specify which columns of the current data set should play which roles in the resulting graph. If appropriate columns are selected beforehand, the dialog box will be skipped. In any case the resulting graph will be displayed in its own graph editor Window.

Pseudocode:

Set tmpDatasetElement to value returned by call to window's element ( ) method,

Set tmpColumnArray to value returned by tmpDatasetElement's selection( ) method, If size of tmpColumnArray is less than two or tmpColumnArray contains non-Column objects,
   Display modal dialog box window in which user can specify which column should be on the X axis and which columns on the Y axis,
   Set tmpColumnArray to X axis column followed by Y axis columns returned by modal dialog box after user dismisses it by clicking OK button or equivalent, Set tmpCurveArray to empty array, Set tmpXColumn to first column in tmpColumnArray, For each tmpYColumn in tmpColumnArray after the first,
   Set tmpCurve to newly constructed XYScatterCurve (tmpXColumn,tmpYColumn), Append tmpCurve to tmpCurveArray, Set tmpGDFD to value returned by tmpDatasetElement's GDFD( ) method, which just returns the value of myGDFD, Set tmpDatasetElement to value returned by tmpXColumn's element( ) method, Set tmpDatasetName to value returned by tmpDatasetElement's name( ) method, Set tmpGraphName to "Graph of" concatenated with tmpDatasetName, Set tmpGraphElement to newly constructed XYScatterGraphElement(tmpGDFD, tmpCurveArray, tmpGraphName).

The other graph creation methods (lineGraphCmd, barGraphCmd, histogramCmd, intervalPlotCmd, boxPlotCmd, xyzScatterPlotCmd, contourCmd, and surfacePlotCmd) and the analysis creation methods (summaryStatistics, manovaCmd, princoCmd, and regressionCmd) are extremely similar to the xyScatterPlotCmd. However, they generally vary in the details of the roles they assign to the columns of data. For example, each column of data in a histogram gets its own curve, rather than having a pair of data columns serve as the basis of each curve as is done for the scatterplot. The analysis elements tend to provide more options in their dialog boxes to set analysis parameters. But these are application specific and are directed more to the analysis implementation than to the GDFD portion of the interface program 11.

The GDFD object used in one embodiment of the present invention will now be described. The GDFD object has the following basic internal states:

| STATE: | COMMENT DESCRIBING GDFD OBJECT STATE: |
|---|---|
| my Elements [ ] | Array of pointers to each Element in the GDFD. |
| myElementDictionary | Dictionary which allows quick lookup of an Element using its text name as the lookup key. Hash tables and binary trees are appropriate techniques for implementing such a dictionary. |

The GDFD object is responsible for performing the following basic operations:

deleteAllElements: delete all the elements in the GDFD, used to start fresh with new contents in the GDFD.

Pseudocode:

While size of myElements array is greater than zero,
   Set tmpElement to last element of myElements array,
   Call tmpElement's deleteElement( ) method.

duplicateElements(elementArray): duplicates a selected set of elements in the GDFD, giving the duplicates unique names using the uniqueElementName method. Relationships between elements in the set should be reproduced in the duplicate set, e.g. if element "A" is source to element "B", in the duplicate set element "A<1>" should be source to element "B<1>". A temporary dictionary can be used to remember the correspondence between original and duplicate objects while the duplication is being done. The preferred embodiment of the invention uses a "deepenCopy" method defined for each class involved in implementing each element, to handle copying an object of that class.

Pseudocode:

Set tmpDictionary to empty dictionary of (oldObject, newObject) pointer associations, For each tmpOldElement in elementArray,
   Call tmpOldElement's deepenCopy(elementArray, tmpDictionary) method.

deepenCopy(elementArray, sharedDictionary) returns newObject: each object involved in implementing elements defines its own deepenCopy method, which returns a pointer to an object of the same class to be used in the duplication. The following generic pseudocode provides a template for the particular concrete deepenCopy methods. In the preferred embodiment, the deepenCopy method is somewhat more general and complex than described here, to handle some copying variations that are not relevant to this invention.

Pseudocode:

If this Object is found in sharedDictionary,
   Return the newobject pointer associated with this Object, Else if this Object is not part of an element in elementArray,
   Return this Object pointer without copying it, Else
   Set tmpobject=new constructed "shallow" copy of this object,
   Add (this Object, tmpobject) association to sharedDictionary, For each object pointer field in tmpObject,
   Set object pointer field to value returned by call to object pointer field's deepenCopy(elementArray, sharedDictionary) method.

elementLookup(name) returns Element: returns element with the given name and returns its index, or a special NULL value if there is no element with that name.

Pseudocode:

If name is found in myElementDictionary,
   Return element associated with name,
Else
   Return NULL.

elementcount( ) returns count: returns the number of elements in the GDFD:

Pseudocode:

Return size of myElements array.

element(index) returns Element: returns the Element object associated with the given index:

Pseudocode:

If index is within bounds of myElement array,
   Return myElement[index],
Else
   Raise index bounds exception.

uniqueElementName(name) returns name: Returns the argument name if there is not already an element with that name, otherwise returns a new name based on the argument name with a unique suffix to return an appropriately unique name for a new element. This operation is used by duplicateElement and the element constructors. This embodiment uses a suffix of the form "<number>" to make the names unique, but any other scheme for systematically modifying the names to make them unique could be used.

Pseudocode:

While name is found in myElementDictionary,
   If name ends with the pattern "<number>",
      Replace "<number>" with "<number+1>" in name,
   Else
      Concatenate "<1>" to the end of name,
Return name.

save(filepath): Save the GDFD and its elements to external persistent storage at the given operating system dependent filepath. In the preferred embodiment of this invention, "writeOut" and "readin" methods are defined for each class of object involved, and writeout writes a "flattened" representation of each object that can be read and restored on a different computer by the corresponding "readin" method. Techniques are used to make only one representation of a given object even if it is referenced many times, and to handle reading in different versions of each class of object so the external format can be enhanced while still allowing older saved files to be read. Alternately, a technology such as an Object Oriented Database system could be used to transparently save and restore the GDFD, its elements, and other objects used in the implementation. The details of the technology of persistent storage are not part of this invention, and thus are not addressed in greater detail.

open(filepath): Loads the GDFD with elements previously saved to external persistent storage at the given operating system dependent filepath. Read the discussion under the save method to understand how open can be embodied.

graphicalLayout( ): runs typical algorithm for graphical layout of the icons for the elements in the GDFD, using the element's iconPositionSet method to set new locations where appropriate. The preferred embodiment supports options for laying the root elements out either in a vertical column from top to bottom with output dependents connected to the right, or the root elements can be in a horizontal row across the top with output dependents connected down below. Elements are spaced far enough apart to allow all dependents to be displayed without graphical overlap. The GDFD editor allows element icons to be moved directly by the user, and redoes the graphicalLayout only in the vicinity of elements or connections that get added or removed. Such algorithms for laying out acyclic directed graph structures are well known in the art, and thus won't be described further here.

print: Print a graphical representation of the GDFD to an external printing device or filepath, depending on arguments and additional print setup information associated with the GDFD. The exemplary embodiment supports an icon display format with an iconic image representing each Element, and with an arrow from each source element to each of its dependent elements. Also provided is an automatic layout algorithm. Furthermore, the user is allowed to interactively position the icons with a graphical editor module. In addition, alternate tabular views of the GDFD sorted by element name, creation time, or element type that can be printed or edited interactively. The exemplary embodiment of this invention assumes that a graphics library is available to handle the details of generating images on both printers and video display screens. Calls to the graphic library are made to display the icons at the graphical (x,y) locations determined by the layout algorithm, to display the name of the icon in an attractive font below the icon, and to draw an arrow graphically between elements to show output links, adjusting the end points of each arrow so it projects through the centers of the icons, but doesn't actually overlap the icons or the labels.

The Element object is used in conjunction with the GDFD object to provide the GDFD feature of the interface program 11 has the following basic internal states:

| INTERNAL STATE | Description of State |
| --- | --- |
| myName | Text name for the element, unique among all elements in a GDFD. |
| myCreationDateTime | Date and time when element was created, used to sort elements by creation date in tabular display. |
| myElementIcon | Reference to graphical icon image used for this type of element. |
| myIconPosition | X, Y coordinates of the graphical icon for this element. |
| myGDFD | Pointer back to GDFD object that contains this Element. |
| myOutputElements [ ] | Array of output Element pointers for this element. |
| myInputElements [ ] | Array of input Element pointers for this element. |
| myOutputSublinks [ ] | Array of arrays of sublink Object pointers, each component array indexed by the index of |

-continued

| INTERNAL STATE | Description of State |
|---|---|
| | its corresponding output element. |

As discussed above, the elements in a GDFD, represented by icons, form an acyclic directed graph structure, in which each element can have zero or more input (i.e. source) elements and zero or more output (i.e. dependent) elements. In the embodiment described here, a dynamically sized array of pointers to the input elements and to the output elements is stored for fast navigation between related elements. As described above, the GDFD object contains an array of all the elements and a dictionary to support fast lookup of elements by name.

The Element object used to implement the GDFD feature of the interface program 11 supports several basic operations. The description of each basic operation, set forth below, is followed by a brief segment of pseudo code for implementing the described operation.

The basic operations that are supported by the Element object are:

inputCount( ) return count: Returns number of elements which are input elements for this element, i.e. this element depends on those elements.

Pseudocode:

Return size of myInputElement array.

inputElement(inputIndex) returns Element: Returns the input Element associated with inputindex for this element.

Pseudocode:

If inputIndex is within bounds of myInputElement array,
  Return myInputElement[inputIndex],
Else
  Raise index bounds exception.

outputcount( ) returns count: Returns number of elements which are output elements for this element, i.e. those elements that depend on this element.

Pseudocode:

Return size of myOutputElement array.

outputElement(outputIndex) returns Element: Returns the Element associated with outputindex for this element.

Pseudocode:

If outputIndex is within bounds of myOutputElement array,
  Return myOutputElement[outputIndex],
Else
  Raise index bounds exception.

name( ) returns name: Returns the unique name associated with this Element.

Pseudocode:

Return string stored in myName.

rename(name): renames this element to the argument name if it is unique, else raises an exception if the name is already in use.

Pseudocode:

If name is not equal to myName,
  If name is already in myGDFD's myElementDictionary,
    Raise nameInUse exception,
  Else
    Remove (myName, this Element) association from myGDFD's myElementDictionary,
    Set myName to name,
    Add (name,this Element) association to myGDFD's myElementDictionary,
    Notify my update dependents that name has changed.

iconPosition( ) returns (x,y) coordinates: Returns the graphical (x,y) location assigned to this element when displayed graphically.

Pseudocode:

Return (x,y) coordinates stored in myIconPosition.

iconPositionSet(x, y): Sets the graphical (x,y) location assigned to this element when displayed graphically.

Pseudocode:

Set myIconPosition to argument(x,y) coordinates, Notify my update dependents that icon location has changed.

It should be noted that in the exemplary embodiment, the link between an element and a single output element is actually a summary of one or more "sublinks" based on component objects of the output element. For example, a graph element can contain several curves, and each curve can display data from the same or different data sets. In such a case, there will be a sublink from a given source data set element to an output graph element for each curve object in the graph that depends on the given source data set. There will also be a single output link from the source data set element to the output graph element as long as there are one or more sublinks between the two elements. In accordance with the interface program of the present invention, the output link will be added when the first sublink is added, and removed when the last sublink is removed.

In the exemplary embodiment of the invention as described here, each Element object stores an array of output Element pointers, an array of input Element pointers, and an array of arrays of sublink object pointers, where each sublink array is indexed by the index of its corresponding output element in the output element array.

This sublink logic is embodied in the following two Element methods for adding and removing sublinks. Methods which are "protected" and only used in implementing specialized subclass elements, as described below.

addSublink(outputElement, sublinkObject): Add a sublink to outputElement via the sublinkObject if the sublink isn't present already, and add a dependency from this Element to output Element if this is the first sublink between them.

Pseudocode:

If outputElement is not found in myOutputElements,
  Add outputElement to the end of myOutputElements array,
  Add a new empty array to the end of myOutputSublinks array,
  Add this Element to the end of outputElement's myInputElements array as a backpointer,
  Set tmpNotifyFlag to true,
Else
  Set tmpNotifyFlag to false,
  Set tmpindex to index of outputElement in myOutputElements,
Set tmpArray to myOutputSublinks[tmpIndex], If sublinkObject is not found in tmpArray,
  Add sublinkObject to the end of tmpArray,
If tmpNotifyFlag is true, Notify my update dependents that a new output link has been added.

removeSublink(outputElement, sublinkObject): Remove sublink to outputElement via the sublinkObject if the sublink is present, and remove the dependency from this Element to output Element if this was the last sublink between them.

Pseudocode:

If outputElement is found in myOutputElements,
    Set tmpIndex to index of outputElement in myOutputElements,
    Set tmpArray to myOutputSublinks[tmpIndex],
    If sublinkObject is found in tmpArray,
        Remove sublinkObject from tmpArray, reducing its size by one,
        If size of tmpArray is now zero,
            Remove outputElement from myOutputElements at tmpIndex,
            Remove tmpArray from myOutputSublinks at tmpIndex,
            Remove this Element from outputElement's myInputElements array to remove backpointer, reducing its size by one,
            Notify my update dependents that an existing link has been removed.

removeOutput(outputElement): Remove all sublinks to outputElement if any sublinks are present, and remove the dependency from this Element to output Element. This method is used when an element is deleted to cleanly break its links even if several sublinks are involved.

Pseudocode:

If outputElement is found in myOutputElements,
    Set tmpIndex to index of outputElement in myOutputElements,
    Set tmpArray to myOutputSublinks[tmpIndex],
    Remove outputElement from myOutputElements at tmpIndex,
    Remove tmpArray from myOutputSublinks at tmpIndex,
    Remove this Element from outputElement's myInputElements array to remove backpointer, reducing its size by one,
    Notify my update dependents that an existing link has been removed.

deleteElement( ): delete this element from its GDFD, and also delete all the elements that depend solely on this element. The final step shown below in deleting the element is to call the destructor method for the element; the destructor method is needed in implementation languages with explicit memory storage management such as C++, to free storage held by the element so it can be reused. In a garbage collected language such as Smalltalk, the destructor call may not be needed at all. The destructor method won't be discussed further.

Pseudocode:

While size of myInputElements array is greater than zero,
    Set tmpInputElement to last element of myInputElements array,
    Call tmpInputElement's removeOutput(this Element) method, to remove each input link to this element;
While size of myOutputElements array is greater than zero,
    Set tmpOutputElement to last element of myOutputElements array,
    Call my removeOutput(tmpOutputElement) method,
    If size of tmpOutputElement's myInputElements array is now zero,
        Call tmpOutputElement's deleteElement ( ) method, recursively;
Remove this Element from myGDFD's myElements array,
Remove (myname, this Element) association from myGDFD's myElementDictionary,
Notify my update dependents that this Element has been deleted,
Call my destructor method.

Constructors for new elements: specialized types or subclasses of Elements can be used to represent different types of elements, with a construction operation for each type that takes arguments identifying source elements or external parameters as appropriate. In accordance with the exemplary embodiment, each subclass constructor will call the base class element constructor first:

base class Element constructor(GDFD, name, iconPixmap): constructs a new element in the given GDFD with the given name, modifying the name as needed to make it unique. Also sets the element pixmap to display in the graphical GDFD view to iconPixmap:

Pseudocode:

Set name to value returned by GDFD's uniqueElementName(name) method,
Construct new Element, setting myName to name, myCreationDateTime to the current date and time, myElementIcon to the iconPixmap, myIconPosition to an arbitrary default position, myGDFD to GDFD, and myOutputElements, myInputElements, and myOutputSublinks to empty arrays.
Add new Element to end of GDFD's myElements array,
Add (name,this Element) association to myGDFD's myElementDictionary, root data set Element constructor(GDFD, name): constructs a new data set element in the given GDFD with the given name. Additional arguments can be used to identify external database or other data sources to be read into the data set. Various methods of implementing the external data connection will be apparent to those skilled in the art and will therefore not be described further.

Pseudocode:

Construct new base class Element(GDFD, name, data set pixmap),
Initialize data set within data set element as required,
Call GDFD's graphicLayout( ) method to change graphical icon locations as appropriate given new root data set element,
Notify GDFD's update dependents that a new element has been added.

Analysis Element constructor(list of columns in sourceDatasetElement, name): constructs a new analysis element in the given GDFD with the given name. Additional arguments can be used to identify the particular type of analysis desired, or specialized method calls on the new analysis element can be used to adjust its parameters.

Pseudocode:

Construct new base class Element(GDFD, name, analysis pixmap),
Initialize special state of analysis element as required, For each column Object in list of columns in sourceDatasetElement,
  Call sourceDatasetElement's addSublink(this Element, column) method to add a sublink via each column from the source data set to the new analysis element,
Call GDFD's graphicLayout( ) method to change graphical icon locations as appropriate given new analysis element,
Notify GDFD's update dependents that a new element has been added.
Graph Element constructor(GDFD, list of curve Objects, name): constructs a new graph element in the given GDFD with the given name. Additional arguments can be used to customize the appearance of the graph. The user interface allows curves to be added or removed from a graph via cut and paste;
each such addition will call addSublink, and each such removal will call removeSublink.
Pseudocode:
Construct new base class Element(GDFD, name, graph pixmap),
Initialize special state of graph element as required,
For each curve Object in list of curves,
  Set tmpSourceElement to source data set element for the curve,
  Call tmpSourceElement's addsublink(this Element, curve) method to add a sublink via each curve from its source data set to the new graph element,
Call GDFD's graphicLayout( ) method to change graphical icon locations as appropriate given new graph element,
Notify GDFD's update dependents that a new element has been added.

In one embodiment of this invention, "editor" objects are used to display graphical views of the GDFD and its elements to the user in windows on an interactive video display screen. The GDFD editor is responsible for registering itself as an update dependent of the GDFD and its elements, displaying the graphical layout of the GDFD (or tabular alternatives) in a window, and updating the graphical view when updateNotify calls indicate that the "model" GDFD and elements have changed in ways that should be reflected in the view to the user. Menu commands and direct manipulation controls allow the user to act on the GDFD and its elements, translating user actions on the editor's window into calls to GDFD and element methods. Editor object classes are also defined for each distinctly different class of element, and the element editors similarly register as update dependents of their element and related objects, and update the displayed view of the element in response to updateNotify calls indicating visible changes.

While the exemplary embodiment of the interface of the present invention has been generally described in the context of a data analysis package implemented using an object oriented programming language, it should be noted that the interface program 11, including the automatic GDFD generation features, may be used with a wide variety of computer applications and implemented using any number of computer programming languages.

What is claimed is:

1. A method of generating a graphical representation of operations performed in a computer system including a processor, an input device, a display device and a memory device containing a data set, the method comprising the steps of:

generating a series of menus including commands;
monitoring the input device to detect a selection of a first command from the menus;
upon detection of the selection of a first command, calling a function corresponding to the first command:
  i. to perform a first operation corresponding to the first command and
  ii. to generate a graphical representation of the first operation by performing the step of generating a first graphical object representing the first operation; and
monitoring the input device to detect a selection of a second command from the menus;
upon the detection of the selection of a second command, calling a function corresponding to the second command:
  i. to perform a second operation corresponding to the second command and
  ii. to generate a graphical representation of the second operation by performing the steps of generating a second graphical object representing the second operation and automatically generating a graphical representation of a functional relationship between the second operation represented by the second graphical object and the first operation represented by the first graphical object.

2. The method of claim 1,
wherein the first command is a data set access command; and
wherein the step of generating a first graphical object upon detection of the selection of the first command includes the step of generating a data set icon.

3. The method of claim 2, further comprising the steps of:
monitoring the input device to detect a selection of a third command from the menus which is the same as the second command; and
upon the detection of the selection of the third command, calling the function corresponding to the second command:
  i. to perform a second operation corresponding to the second command; and
  ii. to generate a graphical representation of the third operation corresponding to the third command by performing the steps of generating a third graphical object representing the third operation corresponding to the third command, the third graphical object being graphically different from the second graphical object, and automatically generating a graphical representation of a functional relationship between the third operation represented by the third graphical object and the first operation represented by the first graphical object.

4. The method of claim 2,
wherein the second command is a statistical analysis command; and
wherein the step of generating a second graphical object includes the step of generating a statistical analysis icon.

5. The method of claim 2,
wherein the second command is a graph command; and
wherein the step of generating a second graphical object includes the step of generating a graphics icon.

6. The method of claim 3, wherein the step of generating a graphical representation of the functional relationship between the first operation represented by the first graphical object and the second operation represented by the second graphical object includes the step of:

generating an arrow connecting the data set icon to the statistical analysis icon.

7. The method of claim 4, wherein the step of generating a graphical representation of the functional relationship between the operation represented by the first graphical object and the second operation represented by the second graphical object includes the step of:
generating an arrow connecting the data set icon to the statistical analysis icon.

8. The method of claim 1, further comprising the steps of:
monitoring the input device to detect selection of commands from the menus subsequent to the selection of the second command; and
upon detection of each command selected subsequent to the second command, calling a function corresponding to the subsequent command:
  i. to perform an operation corresponding to the subsequent command and
  ii. to generate a graphical representation of the performed operations by performing the steps of generating a graphical object representing the performed operation and automatically generating a graphical representation of functional relationship between the performed operation represented by the generated graphical object and at least one operation represented by a previously generated graphical object.

9. The method of claim 8, further comprising the step of:
storing a creation date for each graphical object generated upon the detection of the selection of a command; and
wherein the step of generating the first graphical object includes the step of generating a first text name;
wherein the step of generating the second graphical object includes the step of generating a second text name that is different from the first text name; and
wherein the step of generating a graphical object representing the operation performed for each of the commands selected subsequent to the second command includes the step command includes the step of generating:
a text name that is different from all previously generated text names.

10. An interactive user interface for generating and controlling the display of graphical images representing computer operations performed in response to commands selected by a user, the interface comprising:
a window module for controlling the generation and display of windows including pull-down command menus listing commands for selection by the user;
a graphic data flow diagram module for automatically generating a record of the computer operations that are performed in response to the commands selected from the pull-down command menus,
the graphical data flow diagram module including:
a display module for automatically generating a graphical representation of the record generated by the graphical data flow diagram module, the automatically generated graphical representation including graphical representations of the operations performed in response to the selection of commands from the pull-down command menus and functional relationships between the graphically represented operations.

11. The interactive user interface of claim 10, wherein the graphical data flow diagram module includes a data set element module for storing information concerning each occurrence of a data set access operation.

12. The interactive user interface of claim 11, wherein the graphical data flow diagram module further includes a graphics element module for storing information concerning each occurrence of a graphics operation.

13. The interactive user interface of claim 12, wherein the graphical data flow diagram module further includes a statistical analysis element module for storing information concerning each occurrence of a statistical analysis operation.

14. The interactive user interface of claim 13, wherein the display module includes means for displaying a data set icon for each occurrence of a data set access operation.

15. The interactive user interface of claim 14, wherein the display module includes means for displaying a statistical analysis icon for each occurrence of a statistical analysis operation.

16. The interactive user interface of claim 15, wherein the display module includes means for displaying a graphics icon for each occurrence of a graphics operation.

17. The interactive user interface of claim 16, wherein the display module includes means for automatically generating an arrow originating from a data set icon and extending to a statistical analysis icon to illustrate a source of data used to perform the statistical analysis operation represented by the statistical analysis icon.

18. The interactive user interface of claim 16, wherein the display module further includes means for automatically generating arrows coupling the icons generated by the display module according to functional relationships existing between the operations represented by the icons.

19. The interactive user interface of claim 16, wherein the display module includes means for automatically generating an arrow originating from a data set icon and extending to a graph icon to illustrate a source of data used to perform the graph operation represented by the graph icon.

20. A method of generating a graphical representation of operations performed in a computer system including a processor, an input device, a display device and a memory device containing a data set, the method comprising the steps of:
generating a series of pull-down menus including commands;
detecting the selection of a first command,
upon detecting the selection of the first command calling a function corresponding to the first command:
  i. to perform a first operation corresponding to the first command; and
  ii. to automatically generate a graphical representation of the first operation by generating a first icon representing the first operation; and
detecting the selection of subsequent commands, upon detecting the selection of a subsequent command calling a function corresponding to the subsequent command:
  i. to perform an operation corresponding to the subsequent command; and
  ii. to automatically generate a graphical representation of the performed operation in the form of an acyclic flow diagram by performing the steps of generating an icon representing the performed operation and automatically generating a graphical representation of a functional relationship between the performed operation represented by the generated icon and an operation represented by a previously generated icon.

21. The method of claim 20, wherein the automatically generated graphical representation of the functional relationship between the performed operation represented by the generated icon and the operation represented by the previously generated icon includes an arrow.

* * * * *